(12) United States Patent
Toma et al.

(10) Patent No.: US 8,885,731 B2
(45) Date of Patent: Nov. 11, 2014

(54) IMAGE DECODING METHOD AND IMAGE DECODING APPARATUS

(71) Applicant: Panasonic Corporation, Osaka (JP)

(72) Inventors: Tadamasa Toma, Osaka (JP); Takahiro Nishi, Nara (JP); Youji Shibahara, Osaka (JP); Hisao Sasai, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 13/864,571

(22) Filed: Apr. 17, 2013

(65) Prior Publication Data

US 2013/0279600 A1    Oct. 24, 2013

Related U.S. Application Data

(60) Provisional application No. 61/658,957, filed on Jun. 13, 2012, provisional application No. 61/636,913, filed on Apr. 23, 2012.

(51) Int. Cl.
H04N 7/26 (2006.01)
H04N 19/70 (2014.01)
G06T 9/00 (2006.01)
H04N 19/44 (2014.01)

(52) U.S. Cl.
CPC ............ *G06T 9/00* (2013.01); *H04N 19/00884* (2013.01); *H04N 19/00533* (2013.01)
USPC .................................... 375/240.25

(58) Field of Classification Search
CPC ............................... H04N 21/44004
USPC ....................................... 375/240.25
See application file for complete search history.

(56) References Cited

U.S. PATENT DOCUMENTS 6,584,120 B1   6/2003   Shiomoto et al.
7,535,383 B2   5/2009   Segall et al.
(Continued)

FOREIGN PATENT DOCUMENTS

JP          11-340938        12/1999

OTHER PUBLICATIONS

U.S. Appl. No. 13/942,819 to Tadamasa Toma et al., filed Jul. 16, 2013.

(Continued)

*Primary Examiner* — Jay Patel
*Assistant Examiner* — Francis G Geroleo
(74) *Attorney, Agent, or Firm* — Greenblum & Bernstein, P.L.C.

(57) ABSTRACT

An image decoding method of decoding encoded data per unit included in units that are included in a picture is provided. The image decoding method obtains, from an encoded bitstream including the encoded data, a first flag indicating whether or not a removal time of the encoded data from a buffer for storing the encoded data is set per unit. The image decoding method further obtains, from the encoded bitstream, a second flag indicating whether an interval between removal times of the units is constant or arbitrary when the removal times are set per unit. The image decoding method removes the encoded data from the buffer per unit and at a constant or arbitrary interval according to the second flag, and decodes the removed encoded data.

2 Claims, 38 Drawing Sheets

(56) References Cited

U.S. PATENT DOCUMENTS

| | | | | |
|---|---|---|---|---|
| 2005/0175098 | A1* | 8/2005 | Narasimhan et al. | 375/240.12 |
| 2009/0168900 | A1* | 7/2009 | Shimoyama et al. | 375/240.26 |
| 2009/0190666 | A1* | 7/2009 | Viscito et al. | 375/240.25 |
| 2011/0291866 | A1 | 12/2011 | Kuroki et al. | |
| 2013/0107953 | A1 | 5/2013 | Chen et al. | |
| 2013/0273945 | A1* | 10/2013 | Deshpande | 455/466 |

OTHER PUBLICATIONS

International Search Report and Written Opinion in International Application No. PCT/JP2013/002461, dated Jun. 11, 2013, together with an English language translation of the Written Opinion.

Gary Sullivan and Heiko Schwarz, Editing state of text relating to ITU-T Rec. H.264 | ISO/IEC 14496-10 Amendments 1 and 2, Joint Video Team (JVT) of ISO/IEC MPEG & ITU-T VCEG (ISO/IEC JTC1/SC29/WG11 and ITU-T SG16 Q. 6) 24th Meeting: Geneva, CH, Document: JVT-X066, ITU-T, Jun. 2007, pp. 303, 304, 312-316, 341-356.

Next-generation moving picture coding system MPEG-4 AVC | H.264, Triceps Corporation, Mar. 12, 2004, pp. 147-158. together with a partial English language translation.

Kimihiko Kazui et al., "AHG9: Improvement of HRD for sub-picture based operation," Joint Collaborative Team on Video Coding (JCT-VC) of ITU-T SG16 WP3 and ISO/IEC JTC1/SC29/WG11 $10^{th}$ Meeting: Stockholm, SE, Document: JCTVC-J0136, ITU-T, Jul. 2012.

ISO/IEC 14496-10 (MPEG-4 Part10: Advanced Video Coding), Oct. 1, 2004.

Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, 8th Meeting: San José, CA, USA, Feb. 1-10, 2012, http://phenix.int-evry.fr/jct/doc_end_user/documen ts/8_san%20jose/wg11/jctvc-h1003-v22.zip.

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d4, Ver.5, 9th Meeting: Geneva, CH, Apr. 27-May 7, 2012.

Office Action from United States Patent and Trademark Office (USPTO) in U.S. Appl. No. 13/942,819, dated Jan. 13, 2014.

Notice of Allowance from United States Patent and Trademark Office (USPTO) in U.S. Appl. No. 13/942,819, dated Apr. 1, 2014.

* cited by examiner

FIG. 1

VUI parameters syntax

```
vui_parameters( ) {
    ...
    nal_hrd_parameters_present_flag
    if( nal_hrd_parameters_present_flag )
        hrd_parameters( )
    vcl_hrd_parameters_present_flag
    if( vcl_hrd_parameters_present_flag )
        hrd_parameters( )
    if( nal_hrd_parameters_present_flag || vcl_hrd_parameters_present_flag )
        sub_pic_cpb_flag
    if(sub_pic_cpb_flag != 0 ) {
        variable_sub_pic_removal_period_flag
        if(variable_sub_pic_removal_period_flag == 0 ) {
            num_ctbs_in_subpicture_minus1
            removal_time_offset_length
            picture_interval
        }
    }
    low_delay_hrd_flag
    bitstream_restriction_flag
    ...
}
```

FIG. 2

Picture timing SEI message syntax

```
pic_timing( payloadSize ) {
    if( CpbDpbDelaysPresentFlag ) {
        if( sub_pic_cpb_flag && variable_sub_pic_removal_period_flag )
            num_decoding_units_minus1
        for( i = 0; i <= num_decoding_units_minus1; i++ )
            cpb_removal_delay[ i ]
        dpb_output_delay
    }
}
```

FIG. 3

VUI parameters syntax

```
vui_parameters( ) {
  ...
  nal_hrd_parameters_present_flag
  if( nal_hrd_parameters_present_flag )
    hrd_parameters( )
  vcl_hrd_parameters_present_flag
  if( vcl_hrd_parameters_present_flag )
    hrd_parameters( )
  if( nal_hrd_parameters_present_flag || vcl_hrd_parameters_present_flag )
    sub_pic_cpb_flag
    if( sub_pic_cpb_flag != 0 ) {
      num_ctbs_in_subpicture_minus1
      removal_time_offset_length ──────────┐
      picture_interval ──────┐             │
    }                        │             │
    low_delay_hrd_flag       │             │  They define the interval of
  bitstream_restriction_flag │             │  cpb_removal_delay in decoding
  ...                        │             │  units in the common-interval mode.
}
```

FIG. 4

Buffering period SEI message syntax

```
buffering_period( payloadSize ) {
    seq_parameter_set_id
    if(sub_pic_cpb_flag != 0 ) {
        variable_sub_pic_removal_period_flag
    if( NalHrdBpPresentFlag ) {
        for( SchedSelIdx = 0; SchedSelIdx <= cpb_cnt_minus1; SchedSelIdx++ ) {
            initial_cpb_removal_delay[ SchedSelIdx ]
            initial_cpb_removal_delay_offset[ SchedSelIdx ]
        }
    }
...
}
```

FIG. 5

Picture timing SEI message syntax

```
pic_timing( payloadSize ) {
    if( CpbDpbDelaysPresentFlag ) {
        if( sub_pic_cpb_flag && variable_sub_pic_removal_period_flag )
            num_decoding_units_minus1
        for( i = 0; i <= num_decoding_units_minus1; i++ )
            cpb_removal_delay[ i ]
        dpb_output_delay
    }
}
```

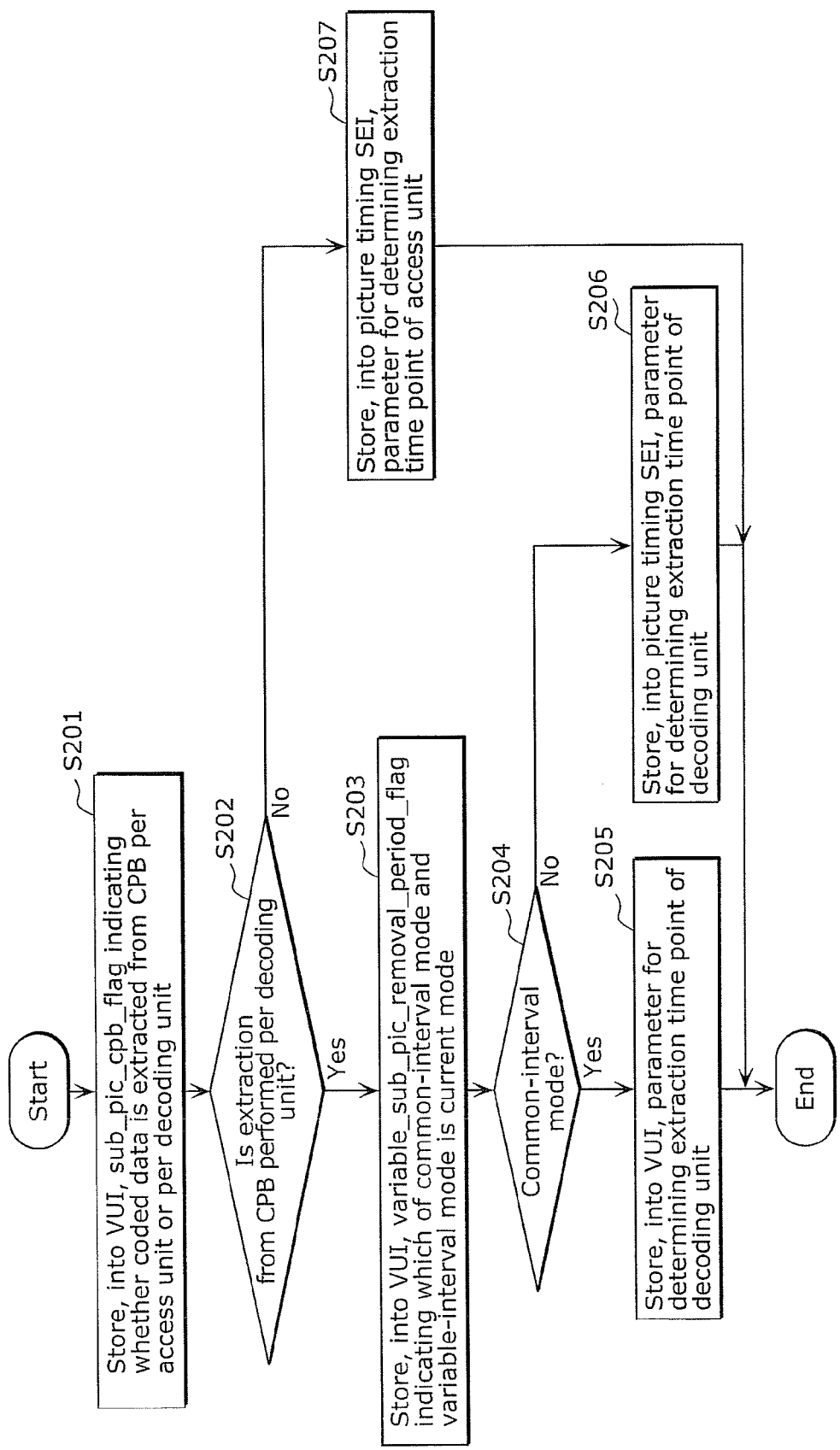

FIG. 9

Decoding Unit CPB delay SEI message syntax

```
du_cpb_delay( payloadSize ) {
    du_cpb_removal_delay
}
```

FIG. 12

```
HEVC_descriptor() {
    descriptor_tag
    descriptor_length
    profile_idc
    reserved_zero_8bits
    level_idc
    sub_pic_cpb_removal_flag
    if( sub_pic_cpb_removal_flag )
        variable_sub_pic_removal_period_flag
        if( !variable_sub_pic_removal_period_flag )
            sub_pic_removal_period
}
```

FIG. 25

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) | ex800

FIG. 36

| Corresponding standard | Driving frequency |
|---|---|
| MPEG-4 AVC | 500 MHz |
| MPEG-2 | 350 MHz |
| ⋮ | ⋮ |

IMAGE DECODING METHOD AND IMAGE DECODING APPARATUS

CROSS REFERENCE TO RELATED APPLICATIONS

The present application claims the benefit of U.S. Provisional Patent Applications No. 61/636,913 filed on Apr. 23, 2012 and No. 61/658,957 filed on Jun. 13, 2012. The entire disclosures of the above-identified applications, including the specification, drawings and claims are incorporated herein by reference in their entirety.

FIELD

One or more exemplary embodiments disclosed herein relate generally to image coding methods and image decoding apparatuses.

BACKGROUND

In order to compress audio data and video data, more than one audio coding standard and video coding standard have been developed. Examples of the video coding standard include the ITU-T standard referred to as H. 26× and the ISO/IEC standard referred to as MPEG-x (see Non Patent Literature (NPL) 1, for example). The most up-to-date video coding standard is the standard referred to as H. 264/MPEG-4AVC. Furthermore, the next-generation coding standard referred to as high efficiency vide coding (HEVC) has been under study (see Non Patent Literature (NPL) 2, for example).

CITATION LIST

Non Patent Literature

[NPL 1] ISO/IEC 14496-10 "MPEG-4 Part 10 Advanced Video Coding"
[NPL 2] Joint Collaborative Team on Video Coding (JCT-VC) of ITU-T SG16 WP3 and ISO/IEC JTC1/SC29/WG11 8th Meeting: San José, Calif., USA, -1-10 Feb., 2012, JCTVC-H1003, "High Efficiency Video Coding (HEVC) text specification draft 6" http://phenix.int-evry.fr/jct/doc_end_user/documents/8_San %20J

SUMMARY

Technical Problem

In such image coding method and image decoding method, a reduction in processing load has been demanded.

Thus, non-limiting and exemplary embodiment provides an image decoding method which enables a reduction in processing load.

Solution to Problem

In one general aspect, the techniques disclosed here feature an image decoding method of decoding encoded data per unit included in one or more units that are included in a picture, the image decoding method comprising: obtaining, from an encoded bitstream including the encoded data, a first flag indicating whether or not a removal time of the encoded data from a buffer is set per unit, the buffer being for storing the encoded data; obtaining, from the encoded bitstream, a second flag indicating whether an interval between removal times of the units is constant or arbitrary when the removal time is set per unit; removing the encoded data from the buffer per unit and at a constant or arbitrary interval according to the second flag; and decoding the removed encoded data.

These general and specific aspects may be implemented using a system, a method, an integrated circuit, a computer program, or a computer-readable recording medium such as a compact disk read only memory (CD-ROM), and may also be implemented using any combination of systems, methods, integrated circuits, computer programs, and recording media.

Advantageous Effects

One or more exemplary embodiments or features disclosed herein provide an image decoding method which enables a reduction in processing load.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 shows an example of a syntax of VUI according to Embodiment 1.
FIG. 2 shows an example of a syntax of picture timing SEI according to Embodiment 1.
FIG. 3 shows an example of a syntax of VUI according to Embodiment 1.
FIG. 4 shows an example of a syntax of buffering period SEI according to Embodiment 1.
FIG. 5 shows an example of a syntax of picture timing SEI according to Embodiment 1.
FIG. 6B is a flowchart of an image coding method according to Embodiment 1.
FIG. 9 shows an example of a syntax of decoding unit CPB delay SEI according to Embodiment 1.
FIG. 12 shows an example of a descriptor according to Embodiment 1.

FIG. 25 illustrates a structure of multiplexed data.

FIG. 36 shows an example of a look-up table in which video data standards are associated with the driving frequencies.

Figure 6A:
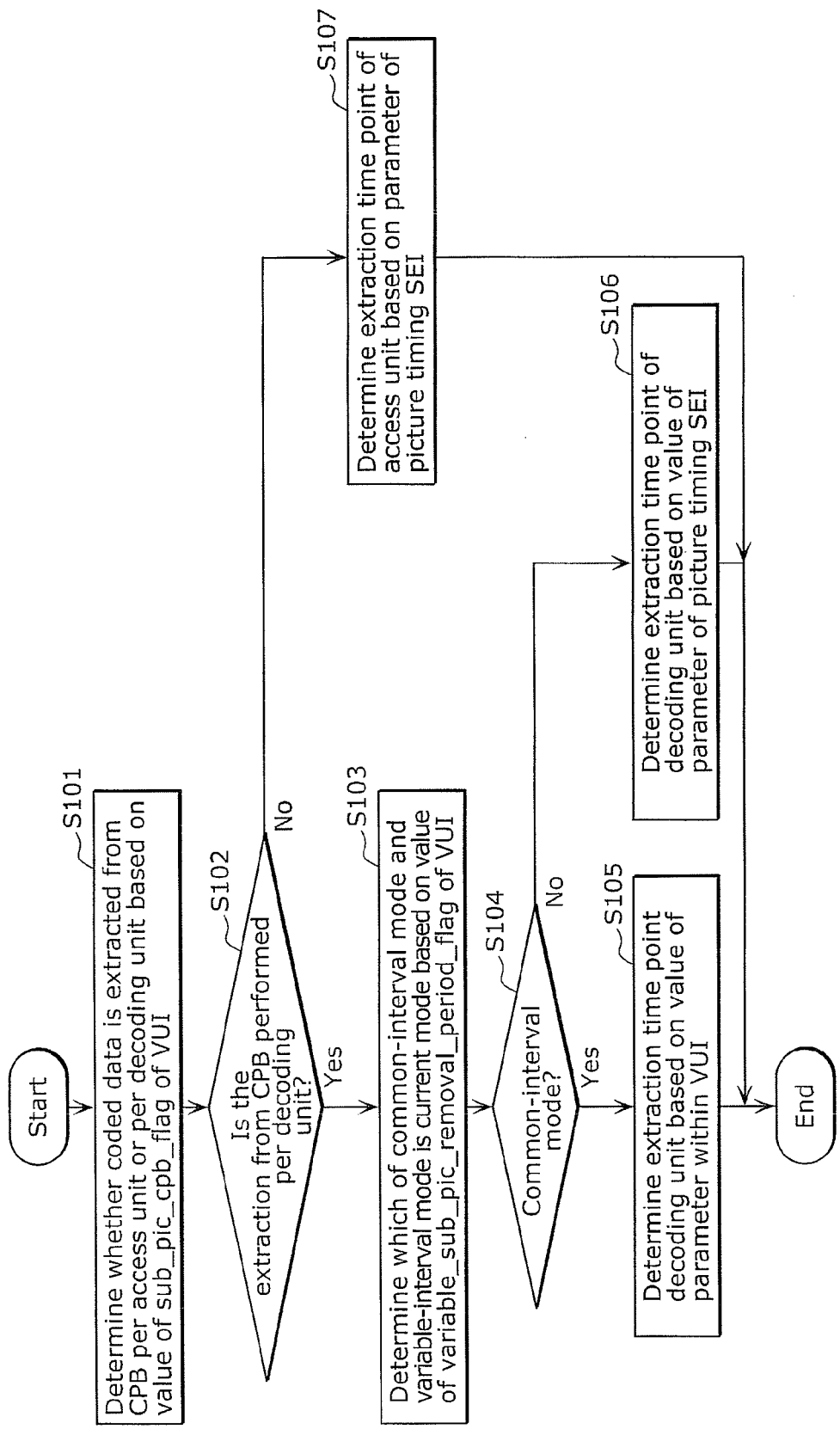
FIG. 6A is a flowchart of an image decoding method according to Embodiment 1.

DESCRIPTION OF EMBODIMENTS (Underlying Knowledge Forming Basis of the Present Disclosure)

In relation to the conventional techniques, the inventors have found the following problem.

The following describes a comparative example of an image decoding apparatus disclosed herein.

An access unit (equivalent to a picture, for example) in video is divided into decoding units. Furthermore, for each of the decoding units, an extraction time point is set which is a point in time when the image decoding apparatus extracts coded data of the decoding unit from a coded picture buffer (CPB). With this, the image decoding apparatus is capable of sequentially decoding coded data of the decoding unit as soon as the coded data is ready. By doing so, the image decoding apparatus does not need to wait for completion of reception of all the data of the access unit and thereby allows a reduction in delay time.

All parameters for determining a time point for extraction of each of the decoding units from the CPB are described in picture timing SEI, for example. Accordingly, the image decoding apparatus needs to parse picture timing SEI within the access unit each time in order to obtain an extraction time point of a decoding unit. Thus, the inventors have found a problem of an increase in load of the image decoding apparatus.

Furthermore, a conceivable method of conveying information on the extraction time point of the decoding unit from the image coding apparatus to the image decoding apparatus is a method of including information on the extraction time point of each of the decoding units into the coded bitstream. However, the intervals between extraction time points of the decoding units need to be different from each other in some cases and may be the same as each other in other cases. The inventors have found that, in the case where the same intervals are used, including the information on the extraction time point of each of the decoding units into the coded bitstream as stated above results in the coded bitstream with redundant information included therein.

In one general aspect, the techniques disclosed here feature an image encoding method of encoding one or more units that are included in a picture, the image coding method comprising: generating a first flag indicating whether or not a removal time of encoded data from a buffer by a hypothetical decoder is set per unit, the buffer being for storing the encoded data; generating a second flag indicating whether an interval between removal times of the units is constant or arbitrary when the removal time is set per unit; and generating an encoded bitstream including the encoded data, the first flag, and the second flag.

By doing so, the image coding method makes it possible to set constant time intervals at which the image decoding apparatus removes per-unit coded data from the buffer. This allows a reduction in processing load in the image decoding apparatus, for example.

For example, it may be that, in the generating of an encoded bitstream, the second flag is included into per-picture-group control information which is included in the encoded bitstream and provided per picture group including one or more pictures.

For example, it may be that the image encoding method further comprises generating common-interval information when the second flag indicates that the interval is constant, the common-interval information indicating the interval, and in the generating of an encoded bitstream, the common-interval information is included into per-picture control information which is included in the encoded bitstream and provided per picture.

For example, it may be that the common-interval information includes a time interval between pictures and a total number of the units included in one picture.

For example, it may be that the image encoding method further comprising generating variable-interval information when the second flag indicates that the interval is arbitrary, the variable-interval information indicating the interval for each of the units, and in the generating of an encoded bitstream, the variable-interval information is included into the per-picture control information.

For example, it may be that the image encoding method further comprises generating variable-interval information when the second flag indicates that the interval is arbitrary, the variable-interval information indicating the interval for each of the units, and in the generating of an encoded bitstream, the variable-interval information is included into per-unit control information which is included in the encoded bitstream and provided per unit.

For example, it may be that the encoded bitstream includes a transport stream and a descriptor, and in the generating of an encoded bitstream, the second flag is included into the descriptor.

Furthermore, according to an exemplary embodiment disclosed herein, an image decoding method of decoding encoded data per unit included in one or more units that are included in a picture, the image decoding method comprises: obtaining, from an encoded bitstream including the encoded data, a first flag indicating whether or not a removal time of the encoded data from a buffer is set per unit, the buffer being for storing the encoded data; obtaining, from the encoded bitstream, a second flag indicating whether an interval between removal times of the units is constant or arbitrary when the removal time is set per unit; removing the encoded data from the buffer per unit and at a constant or arbitrary interval according to the second flag; and decoding the removed encoded data.

By doing so, the image decoding method allows a reduction in processing load.

For example, it may be that, in the obtaining of a second flag, the second flag is obtained from per-picture-group control information which is included in the encoded bitstream and provided per picture group including one or more pictures.

For example, it may be that the image decoding method further comprises obtaining common-interval information from per-picture control information when the second flag indicates that the interval is constant, the common-interval information indicating the interval, and the per-picture control information being included in the encoded bitstream and provided per picture, and in the removing, when the second flag indicates that the interval is constant, the encoded data is removed from the buffer per unit and at the interval indicated in the common-interval information.

For example, it may be that the common-interval information indicates a time interval between pictures and a total number of the units included in one picture, and in the removing, the interval is calculated using the time interval between the pictures and the total number of the units, and the encoded data is removed from the buffer per unit and at the calculated interval.

For example, it may be that the image decoding method further comprises obtaining variable-interval information from the per-picture control information when the second flag indicates that the interval is arbitrary, the variable-interval information indicating the interval for each of the units, and in the removing, when the second flag indicates that the interval is arbitrary, the encoded data is removed from the buffer per unit and at the interval indicated in the variable-interval information.

For example, it may be that the image decoding method further comprises obtaining variable-interval information from per-unit control information when the second flag indicates that the interval is arbitrary, the variable-interval information indicating the interval for each of the units, and the per-unit control information being included in the encoded bitstream and provided per unit, and in the removing, when the second flag indicates that the interval is arbitrary, the encoded data is removed from the buffer per unit and at the interval indicated in the variable-interval information.

For example, it may be that the encoded bitstream includes a transport stream and a descriptor, and in the obtaining of a second flag, the second flag is obtained from the descriptor.

Furthermore, according to an exemplary embodiment disclosed herein, an image encoding apparatus for encoding one or more units that are included in a picture comprises: control circuitry; and storage accessible from the control circuitry, wherein the control circuitry executes: generating a first flag indicating whether or not a removal time of encoded data from a buffer by a hypothetical decoder is set per unit, the buffer being for storing the encoded data; generating a second flag indicating whether an interval between removal times of the units is constant or arbitrary when the removal time is set per unit; and generating an en coded bitstream including the encoded data, the first flag, and the second flag.

By doing so, the image coding apparatus is capable of setting constant time intervals at which the image decoding apparatus removes per-unit coded data from the buffer. This allows a reduction in processing load in the image decoding apparatus, for example.

Furthermore, according to an exemplary embodiment disclosed herein, an image decoding apparatus for decoding encoded data per unit included in one or more units that are included in a picture comprises: control circuitry; and storage accessible from the control circuitry, wherein the control circuitry executes: obtaining, from an encoded bitstream including the encoded data, a first flag indicating whether or not a removal time of the encoded data from a buffer is set per unit, the buffer being for storing the encoded data; obtaining, from the encoded bitstream, a second flag indicating whether an interval between removal times of the units is constant or arbitrary when the removal time is set per unit; removing the encoded data from the buffer per unit and at a constant or arbitrary interval according to the second flag; and decoding the removed encoded data.

By doing so, the image decoding apparatus allows a reduction in processing load.

Furthermore, according to an exemplary embodiment disclosed herein, an image encoding and decoding apparatus comprises the above image encoding apparatus and the above image decoding apparatus.

These general and specific aspects may be implemented using a system, a method, an integrated circuit, a computer program, or a computer-readable recording medium such as a compact disk read only memory (CD-ROM), and may also be implemented using any combination of systems, methods, integrated circuits, computer programs, and recording media.

The following specifically describes exemplary embodiments with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not the scope of the appended Claims and their euqivalents. Therefore, among the structural elements in the following exemplary embodiments, structural elements not recited in any one of the independent claims indicating the broadest concept are described as arbitrary structural elements.

(Embodiment 1)

An image coding apparatus and an image decoding apparatus according to this embodiment each use two modes: an interval between time points for extraction of the decoding units in the access unit from the CPB is (i) constant in one mode (Common-interval mode) and (ii) arbitrary in the other mode (Variable-interval mode). The image coding apparatus assumes, as a hypothetical reference decoder, that image decoding apparatus to which information is transmitted, and switches the method of generating and transmitting extraction time point information for each of the modes.

As an example, the image coding apparatus and the image decoding apparatus each basically use the common-interval mode. The image coding apparatus and the image decoding apparatus each use the variable-interval mode for video which is largely different in code amount depending on a region within the access unit.

Furthermore, the image coding apparatus may include information indicating an interval between extraction time points into, instead of an access unit, a unit (e.g., a unit of pictures) at a higher level than the access unit such as a sequence parameter set (SPS). With this, the image decoding apparatus does not need to perform the parsing per access unit.

The image decoding apparatus parses a unit at a higher level than the access unit, such as the SPS (more specifically, video usability information (VUI) in the SPS), to judge whether the current mode is the common-interval mode or the variable-interval mode, and according to the judged mode, switches the method of obtaining the extraction time point information.

Furthermore, the image decoding apparatus which supports only the common-interval mode may start decoding per access unit without starting decoding per decoding unit when it is judged that the current mode is the variable-interval mode.

The coded stream is generally transmitted in the form of being multiplexed using the MPEG-2 transport stream (TS), the MP4, the real-time transport protocol (RTP), or the like. Thus, the image coding apparatus may transmit, in a multiplex layer, information common to sequences (sets of pictures), such as information for identifying the above mode and an interval between extraction time points in the common-interval mode.

A first syntax example according to this embodiment is described below.

FIG. 1 shows a syntax example of the VUI included in the SPS. FIG. 2 shows a syntax example of picture timing SEI which is assigned to each access unit.

A variable-interval flag (variable_sub_pic_removal_period_flag) that is information indicating whether the interval between time points for extraction from the CPB among the decoding units in the access unit is the common-interval mode or the variable-interval mode is stored into the VUI. Furthermore, the image decoding apparatus determines the interval between extraction time points using a parameter within the VUI in the case of the common-interval mode and determines the interval between extraction time points using a parameter within the picture timing SEI in the case of the variable-interval mode.

For example, when the variable-interval flag (variable_sub_pic_removal_period_flag) is 0, the interval between time points for extraction from the CPB is common to the decoding units within the access unit (the common-interval mode). In addition, the interval between the extraction time points is defined by a subsequent syntax within the VUI.

On the other hand, when the variable-interval flag is 1, the interval between time points for extraction from the CPB is arbitrary among the decoding units within the access unit (the variable-interval mode). In addition, the interval between the extraction time points is defined by the picture timing SEI which is assigned to each access unit.

In addition, a unit-of-decoding flag (sub_pic_cpb_flag) included in the VUI indicates whether the setting of the decoding process (the extraction of coded data from the CPB) is performed per access unit (picture) or per decoding unit. When the unit-of-decoding flag is 0, it indicates per access unit, and when the unit-of-decoding flag is 1, it indicates per decoding unit.

The definitions of other syntaxes are as stated in NPL 2, for example.

When the unit-of-decoding flag (sub_pic_cpb_flag) and the variable-interval flag (variable_sub_pic_removal_period_flag) are both 1, num_decoding_units_minus1 and cpb_removal_delay exist within the picture timing SEI. The number of decoding units within the access unit is num_decoding_units_minus1+1. And cpb_removal_delay defines a time point for extraction of each of the decoding units from the CPB.

In other cases, num_decoding_units_minus1 does not exist within the picture timing SEI and its value is regarded as 0.

When the unit-of-decoding flag (sub_pic_cpb_flag) is 0, the extraction from the CPB is performed per access unit, and the extraction time point is determined based on cpb_removal_delay.

When the unit-of-decoding flag is 1 and the variable-interval flag is 0 (sub_pic_cpb_flag=1&& variable_sub_pic_removal_period_flag=0), the extraction from the CPB is performed per decoding unit, and the extraction time point is determined based on a parameter within the VUI.

A second syntax example according to this embodiment is described below.

FIG. 3 shows a syntax example of the VUI included in the SPS. FIG. 4 shows a syntax example of buffering period SEI included in the SPS. FIG. 5 shows a syntax example of picture timing SEI which is assigned to each access unit.

In this syntax example, a variable-interval flag (variable_sub_pic_removal_period_flag) that is information indicating whether the interval between extraction time points of the decoding units in the access unit is the common-interval mode or the variable-interval mode is stored into the buffering period SEI. Here, the buffering period SEI is included in the SPS, for example, just as is the VUI. In other words, the buffering period SEI is generated per set of pictures.

Furthermore, the image decoding apparatus determines the interval between extraction time points using a parameter within the VUI in the case of the common-interval mode and determines the interval between extraction time points using a parameter within the picture timing SEI in the case of the variable-interval mode.

In other words, the image coding apparatus defines the variable-interval flag (variable_sub_pic_removal_period_flag) in the buffering period SEI.

When the unit-of-decoding flag (sub_pic_cpb_flag) is 1, the image coding apparatus may store, into the buffering period SEI, removal_time_offset defined in hrd_parameters( ) within the VUI.

Furthermore, the image coding apparatus may store, into the buffering period SEI, a parameter (num_ctbs_in_subpicture_minus1 and picture_interval) for determining a time point for extraction of a decoding unit from the CPB in the common-interval mode.

Next, a flow of the image decoding method which is performed by the image decoding apparatus according to this embodiment is described.

FIG. 6A is a flowchart of the image decoding method according to this embodiment.

First, the image decoding apparatus determines whether the coded data is extracted from the CPB per access unit or per decoding unit, based on the value of the unit-of-decoding flag (sub_pic_cpb_flag) included in the VUI (S101).

When the extraction from the CPB is performed per decoding unit (Yes in S102), the image decoding apparatus determines which of the common-interval mode and the variable-interval mode is the current mode, based on the value of the variable-interval flag (variable_sub_pic_removal_period_flag) included in the VUI (S103).

When the current mode is the common-interval mode (Yes in S104), the image decoding apparatus determines an extraction time point of a decoding unit based on the parameter (num_ctbs_in_subpicture_minus1 and picture_interval) included in the VUI (S105).

On the other hand, when the current mode is the variable-interval mode (No in S104), the image decoding apparatus determines an extraction time point of a decoding unit based on the parameter (cpb_removal_delay) included in the picture timing SEI (S106).

Furthermore, when the extraction from the CPB is performed per access unit (No in S102), the image decoding apparatus determines an extraction time point of an access unit based on a parameter included in the picture timing SEI (S107).

Next, a flow of the image coding method which is performed by the image coding apparatus according to this embodiment is described.

FIG. 6B is a flowchart of an image coding method according to this embodiment.

First, the image coding apparatus determines whether the coded data is extracted from the CPB per access unit or per decoding unit. The image coding apparatus then stores, into the VUI, the unit-of-decoding flag (sub_pic_cpb_flag) indicating a result of the determination (S201).

When the extraction from the CPB is performed per decoding unit (Yes in S202), the image coding apparatus determines which of the common-interval mode and the variable-interval mode is the current mode, and stores, into the VUI, the variable-interval flag (variable_sub_pic_removal_period_flag) indicating a result of the determination (S203).

When the current mode is the common-interval mode (Yes in S204), the image coding apparatus determines an extraction time point of a decoding unit, and stores, into the VUI, the parameter (num_ctbs_in_subpicture_minus2 and picture_interval) indicating a result of the determination (S205).

On the other hand, when the current mode is the variable-interval mode (No in S204), the image coding apparatus stores, into the picture timing SEI, the parameter (cpb_removal_delay) for determining an extraction time point of a decoding unit (S206).

When the extraction from the CPB is performed per access unit (No in S202), the image coding apparatus stores, into the picture timing SEI, the parameter for determining an extraction time point of an access unit (S207).

It is to be noted that, according to instructions given from outside, the image coding apparatus selects a unit of extraction (per-access-unit extraction or per-decoding-unit extraction) of coded data from the CPB, selects the common-interval mode or the variable-interval mode, determines an extraction time point of a decoding unit, and determines an extraction time point of an access unit, for example. In addition, the image coding apparatus may perform the selection or the determination according to information obtained from outside, properties of an input image, and the like.

Here, in the case where the common-interval mode is used, the image coding apparatus adjusts the coding process so that the amount of data in each decoding unit falls within a certain range. This allows a reduction in the delay in the decoding process in the image decoding apparatus which is due to data in a certain decoding unit being large in amount. This means that the common-interval mode is useful for the case where real-time operation is demanded. On the other hand, in the variable-interval mode, the image coding apparatus can adaptively change the amount of data in a decoding unit as needed. By doing so, it is possible to allocate a large amount of data to a decoding unit which requires a large amount of data in order to provide a certain degree of image quality, for example. This means that the variable-interval mode is useful for the case where priority is given to image quality.

Next, a structure of the image decoding apparatus according to this embodiment is described.

Figure 7A:
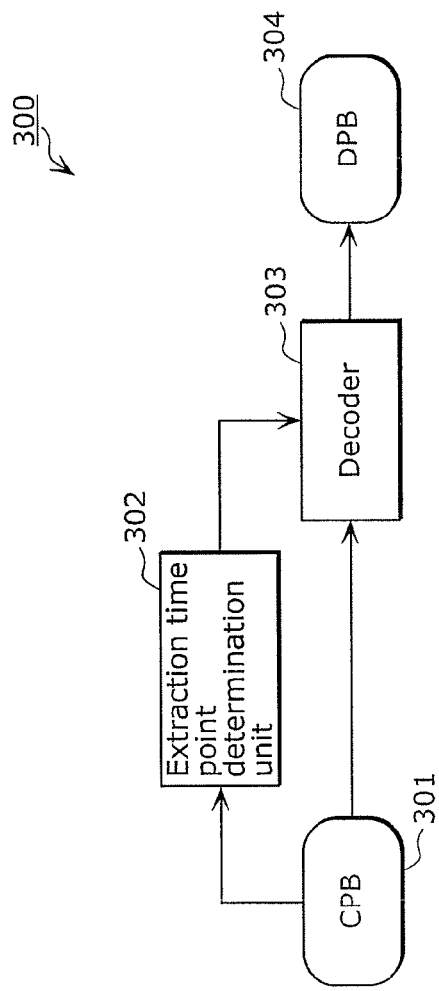
FIG. 7A is a block diagram of an image decoding apparatus according to Embodiment 1.

FIG. 7A is a block diagram of the image decoding apparatus according to this embodiment. As shown in FIG. 7A, the image decoding apparatus 300 includes a CPB 301, an extraction time point determination unit 302, a decoder 303, and a DPB 304.

The CPB 301 is a buffer (memory) for temporarily storing the coded stream.

The external time point determination unit 302 determines a time point of per-access-unit extraction from the CPB 301 and a time point of per-decoding-unit extraction from the CPB 301.

The decoding unit 303 obtains coded data from the CPB 301 per access unit or per decoding unit at the extraction time points determined by the extraction time point determination unit 302, decodes the obtained coded data, and stores the resultant decoded data into the DPB 304.

The DPB 304 is a buffer (memory) for temporarily storing the decoded data.

Figure 7B:
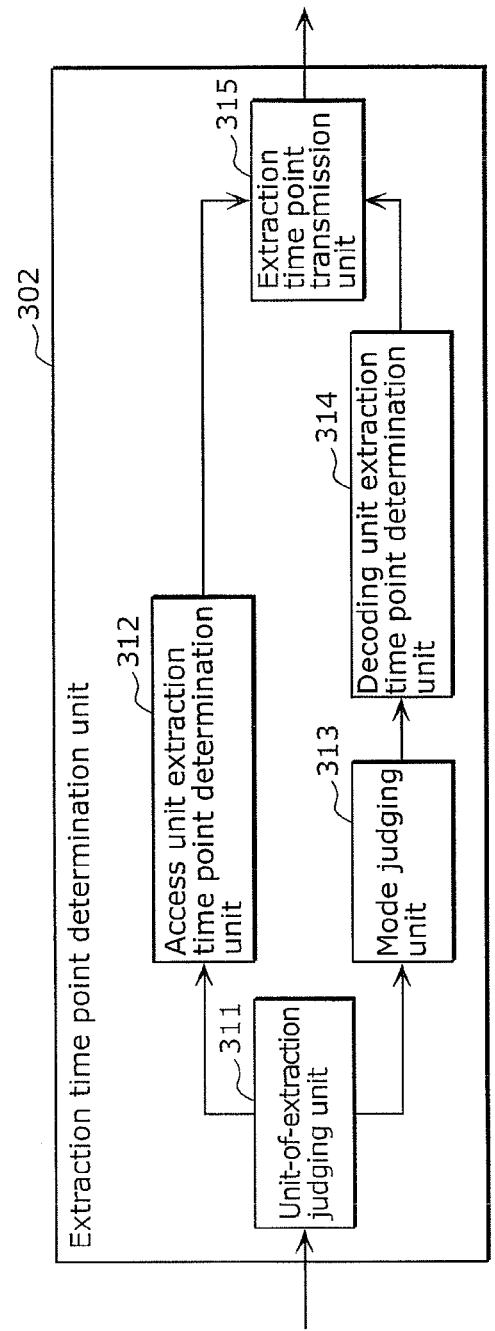
FIG. 7B is a block diagram of an extraction time point determination unit included in the image decoding apparatus according to Embodiment 1.

FIG. 7B is a block diagram of the extraction time point determination unit 302. As shown in FIG. 7B, the extraction time point determination unit 302 includes a unit-of-extraction judging unit 311, an access unit extraction time point determination unit 312, a mode judging unit 313, a decoding unit extraction time point determination unit 314, and an extraction time point transmission unit 315.

The unit-of-extraction judging unit 311 judges whether the coded data is extracted from the CPB 301 per access unit or per decoding unit.

The access unit extraction time point determination unit 312 determines a time point for extraction of an access unit from the CPB 301 when the coded data is extracted per access unit.

The mode judging unit 313 judges which of the common-interval mode and the variable-interval mode is the current mode when the coded data is extracted per decoding unit.

The decoding unit extraction time point determination unit 314 determines, using a result of the judgment made by the mode judging unit 313, a time point for extraction of each of the decoding units included in the access unit from the CPB 301.

The extraction time point transmission unit 315 transmits, to the decoder 303, the extraction time point of the access unit determined by the access unit extraction time point determination unit 312 or the extraction time point of the decoding unit determined by the decoding unit extraction time point determination unit 314.

Figure 8A:
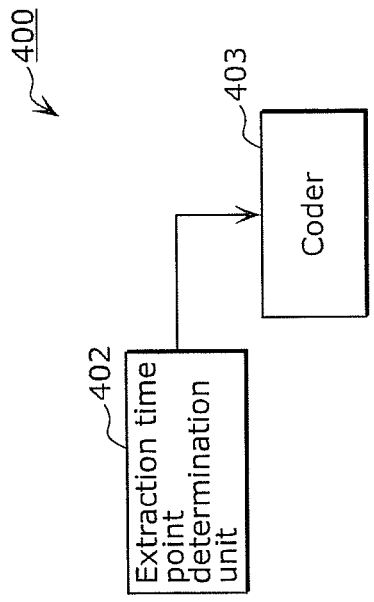
FIG. 8A is a block diagram of an image coding apparatus according to Embodiment 1.

FIG. 8A is a block diagram of the image coding apparatus according to this embodiment. As shown in FIG. 8A, the image coding apparatus 400 includes an extraction time point determination unit 402 and a coder 403.

The extraction time point determination unit 402 determines, for the image decoding apparatus, a time point of per-access-unit extraction from the CPB and a time point of per-decoding-unit extraction from the CPB.

The coder 403 codes an input image. Furthermore, the coder 403 codes information indicating a result of determination made by the extraction time point determination unit 402. The coder 403 then generates a coded bitstream including the coded input image and the coded information.

Figure 8B:
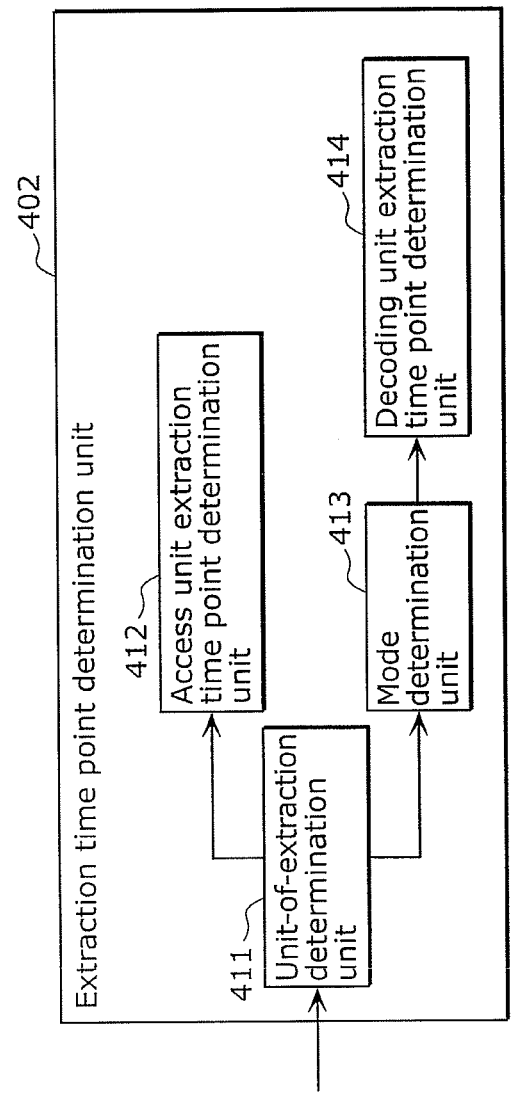
FIG. 8B is a block diagram of an extraction time point determination unit included in the image coding apparatus according to Embodiment 1.

FIG. 8B is a block diagram of the extraction time point determination unit 402. As shown in FIG. 8B, the extraction time point determination unit 402 includes a unit-of-extraction determination unit 411, an access unit extraction time point determination unit 412, a mode determination unit 413, and a decoding unit extraction time point determination unit 414.

The unit-of-extraction determination unit 411 determines whether the extraction of the coded data from the CPB in the image decoding apparatus is performed per access unit or per decoding unit.

The access unit extraction time point determination unit 412 determines a time point for extraction of an access unit from the CPB when the coded data is extracted per access unit.

The mode determination unit 413 determines which of the common-interval mode and the variable-interval mode is the current mode when the coded data is extracted per decoding unit.

The decoding unit extraction time point determination unit 414 determines, using a result of the determination made by the mode determination unit 413, a time point for extraction of the coded data of each of the decoding units included in the access unit from the CPB.

A result of the determination by each of the above processing unit is coded by the coder 403.

Next, SEI indicating a per-decoding-unit CPB extraction time point is described.

In the case of the variable-interval mode, the image coding apparatus in the above description stores, into the picture timing SEI, the CPB extraction time point of each of the decoding units included in the access.

However, in this configuration, since the code amount varies for each decoding unit, the image coding apparatus cannot determine the CPB extraction time point of each decoding unit until coding of all the decoding units included in the access unit is completed. Thus, the image coding apparatus cannot determine the data of picture timing SEI until coding of the last decoding unit included in the access unit is completed. Furthermore, the picture timing SEI is in the decoding unit located first in the access unit when transmitted. As a result, the image coding apparatus cannot sequentially transmit decoding units as soon as coding of each decoding unit is completed This leads to increased delay on the transmission side especially when content is transmitted in real time.

Thus, SEI which stores the CPB extraction time point of each decoding unit is defined. With this SEI assigned to the decoding unit, the image coding apparatus can transmit data of the decoding unit as soon as coding of the coding unit is completed.

FIG. 9 shows an example of a syntax of decoding unit CPB delay SEI that is the SEI which stores a per-decoding-unit CPB extraction time point.

This SEI is valid when the extraction from the CPB is performed per decoding unit in the variable-interval mode. Furthermore, this SEI indicates the CPB extraction time point of the decoding unit which includes this SEI and slice data (stored in a VCL NAL unit).

Specifically, this SEI includes du_cpb_removal_delay. du_cpb_removal_delay indicates the CPB extraction time point of the decoding unit.

When the decoding unit CPB delay SEI is used, picture timing SEI indicates a per-access-unit CPB extraction time point and a DPB extraction time point. In other words, the per-decoding unit CPB extraction time point is managed by the decoding unit CPB delay SEI.

Figure 10:
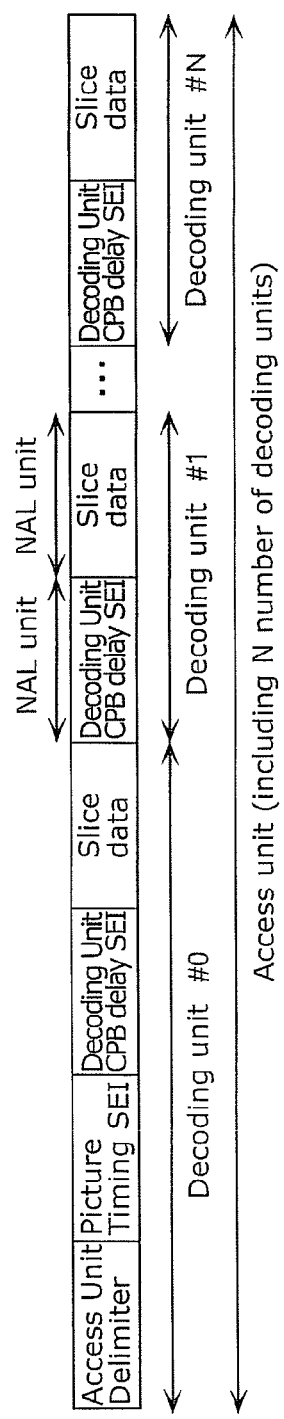
FIG. 10 shows a structure example of a coded bitstream according to Embodiment 1.
Figure 11:
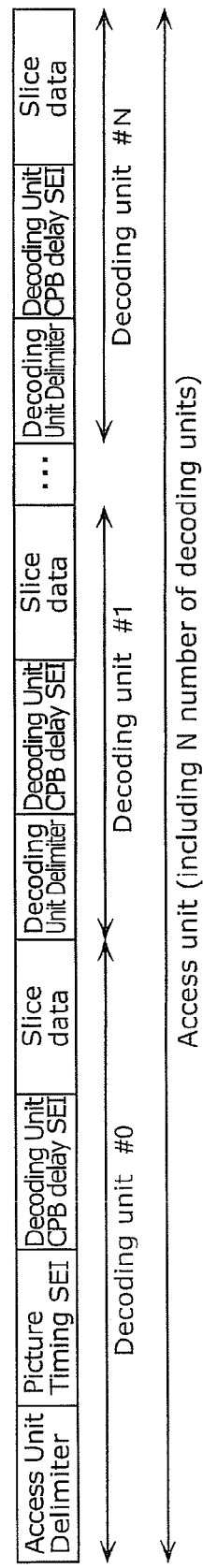
FIG. 11 shows a structure example of a coded bitstream according to Embodiment 1.

FIGS. 10 and 11 each show a structure example of the access unit.

As shown in FIG. 10, each decoding unit includes decoding unit CPB delay SEI and slice data. The decoding unit located first further includes an access unit delimiter and picture timing SEI. The access unit delimiter indicates the beginning of an access unit.

Just as the access unit delimiter, a NAL unit (decoding unit delimiter) indicating the beginning of a decoding unit may be introduced as shown in FIG. 11. The beginning of the decoding unit located first in the access unit may be indicated by the access unit delimiter.

The following describes a variation of the image coding method and the image decoding method according to this embodiment.

In the common-interval mode, although the image coding apparatus stores, into the VUI, information indicating the interval between the per-decoding-unit CPB extraction time points in the example shown in FIGS. 1 and 2, the image coding apparatus may set, based on predetermined common intervals, information on the CPB extraction time point in the picture timing SEI, instead of storing into the VUI the information indicating the time interval between the extraction time points. In this case, since the CPB extraction time points of the decoding units included in the same sequence are constant, the information on the CPB extraction time point within the picture timing SEI is also constant. Accordingly, in the common-interval mode, the image decoding apparatus parses the information on the CPB extraction time point in the access unit located first in a sequence, and is able to use, for the subsequent access units, the information on the CPB extraction time point obtained for the first access unit.

Although the decoding unit delimiter indicates a boundary of the decoding units in the example of FIGS. 10 and 11, the decoding unit delimiter does not need to be used when the number of NAL units of slice data included in the decoding unit is fixed. In this case, the image decoding apparatus may judge a boundary of the decoding units based on a NAL unit of slice data. For example, the image coding apparatus provides such setting that when there is one NAL unit of slice data included in the decoding unit, the decoding unit located first in the access unit begins with an access unit delimiter, and each of the second and subsequent decoding units begins with a corresponding one of the second and subsequent NAL units of slice data. By doing so, the image decoding apparatus can judge a boundary of the decoding units.

Next, a method for multiplexing packets into MPEG-2 TS is described.

Information indicating whether the coded data is extracted from the CPB per access unit or per decoding unit will affect system operations, such as decoding and display, and therefore desirably be transmitted before decoding by a means different from the coded stream. In the case where the extraction is performed per decoding unit, the same applies to information indicating which of the common-interval mode and the variable-interval mode is the current mode.

For example, the use of a descriptor enables transmission of the information as part of program information from the image coding apparatus to the image decoding apparatus. It is to be noted that, other than the method using a descriptor, stream_id or program_id that is different between the case where the extraction is performed per access unit and the case where the extraction is per decoding unit may be used to transmit a unit of extraction from the image coding apparatus to the image decoding apparatus.

FIG. 12 shows an example of this descriptor. In FIG. 12, sub_pic_cpb_removal_flag is a flag indicating whether the coded data is extracted from the CPB per access unit or per decoding unit. When this flag is 1, the extraction is performed per decoding unit, and when this flag is 0, the extraction is performed per access unit.

Meanwhile, variable_sub_pic_removal_period_flag is a flag indicating whether the decoding unit is extracted from the CPB in the common-interval mode or the variable-interval mode. When this flag is 1, the current mode is the variable-interval mode, and when this flag is 0, the current mode is the common-interval mode.

In addition, sub_pic_removal_period is valid only in the common-interval mode. This sub_pic_removal_period indicates a difference between time points for extraction of consecutive decoding units from the CPB (an interval between extraction time points of decoding units).

It is to be noted that, instead of transmitting information directly indicating a difference between extraction time points to the image decoding apparatus, the image coding apparatus may transmit an interval between decoding time stamps (DTSs) of access units consecutive in decoding order and the number of decoding units included in the access unit. In this case, using the information, the image decoding apparatus can obtain the difference by calculation.

Furthermore, the image coding apparatus may include the difference between the CPB extraction time points into coded data (such as SPS or picture timing SEI) transmitted in the PES packets instead of including the difference into the descriptor. In this case, the image decoding apparatus obtains the difference between the CPB extraction time points from the SPS, the picture timing SEI, or the like.

Furthermore, the image coding apparatus may transmit, to the image decoding apparatus, information indicating whether or not the number of decoding units included in the access unit is fixed. Moreover, when the number of decoding units included in the access unit is fixed, the image coding apparatus may transmit, to the image decoding apparatus, information indicating the number of decoding units included in the access unit. By doing so, the image decoding apparatus can identify the last decoding unit in the access unit, for example.

Furthermore, when the frame rate is fixed, the image decoding apparatus can determine the CPB extraction time point of each decoding unit by dividing the interval between DTSs of frames by the number of decoding units. By doing so, the image decoding apparatus can determine the CPB extraction time point of each decoding unit included in an access unit at the stage when the DTS of the access unit is obtained from the header of the PES packet.

Here, in a PES packet in the MPEG-2 TS, the minimum unit to which a decoding time stamp (DTS) can be assigned is an access unit. Thus, the image decoding apparatus obtains a DTS of the decoding unit from the descriptor shown in FIG. 12 or information within the coded stream and transmits the DTS to the decoder.

Figure 13:
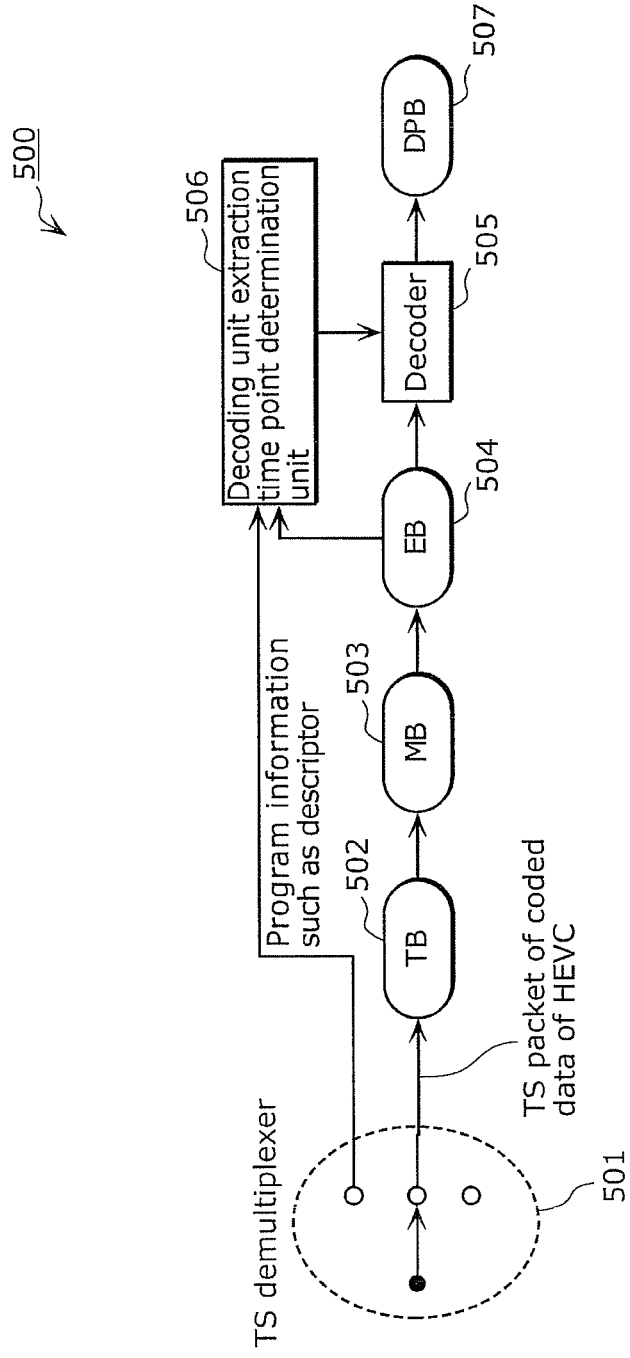
FIG. 13 is a block diagram of the image decoding apparatus (STD) according to Embodiment 1.

FIG. 13 is a block diagram of a system target decoder (STD) for transmitting a DTS of the decoding unit.

This STD 500 is an example of the image decoding apparatus according to this embodiment and includes a TS demultiplexer 501, a transport buffer (TB) 502, a multiplexing buffer (MB) 503, an elementary stream buffer (EB) 504, a decoder 505, a decoding unit extraction time point determination unit 506, and a decoded picture buffer (DPB) 507.

The unit of extraction and the method of determining extraction time points are dependent on whether the extraction is performed per access unit or per decoding unit.

When operating per access unit, the STD 500 operates based on DTSs of the PES packets, and when operating per decoding unit, the STD 500 operates according to separately obtained extraction time points of the decoding units.

When performing the extraction per decoding unit, the STD 500 uses, as a DTS of the PES packet, the extraction time point of the decoding unit located first in the access unit.

The TS demultiplexer 501 classifies data included in an input stream by filtering it based on PIDs. Specifically, the TS demultiplexer 501 outputs, to the decoding unit extraction time point determination unit 506, program information such as a descriptor included in the input stream. Furthermore, the TS demultiplexer 501 outputs a TS packet including coded data of HEVC to the TB 502. This coded data is input to the decoder 505 and the decoding unit extraction time point determination unit 506 through the MB 503 and the EB 504.

The decoding unit extraction time point determination unit 506 judges, based on information included in the descriptor or the like, whether the STD 500 operates per decoding unit or per access unit. Furthermore, when the STD 500 operates per decoding unit, the decoding unit extraction time point determination unit 506 obtains a DTS of a decoding unit and transmits the DTS to the decoder 505.

Specifically, when the current mode is the common-interval mode, and the descriptor indicates an interval T between the CPB extraction time points of the decoding units, the decoding unit extraction time point determination unit 506 determines a DTS of the decoding unit based on the interval T and the DTS of the access unit obtained from the PES packet header.

On the other hand, when the current mode is the variable-interval mode, the decoding unit extraction time point determination unit 506 parses picture timing SEI, decoding unit CPB delay SEI, or the like and thereby determines a DTS of the decoding unit.

When operating per access unit, the STD 500 operates per access unit based on DTSs of the PES packets or the like as it conventionally does.

The decoding unit 505 extracts the coded data included in the decoding unit from the EB 504 according to the extraction time point of the decoding unit transmitted from the decoding unit extraction time point determination unit 506.

Furthermore, the decoding unit 505 determines a boundary of decoding units based on the decoding unit delimiter or the starting position of a NAL unit storing slice data.

It is to be noted that the decoding unit extraction time point determination unit 506 may also detect the boundary of decoding units and transmit a data size of the decoding unit to the decoder 505. In this case, the decoder 505 extracts the data for the transmitted data size from the EB 504.

The DPB 507 stores the decoded data generated by the decoder 505.

It is to be noted that the operation of the image coding apparatus is as described above except that various information is stored into a descriptor.

The following describes a variation of the method of setting a DTS of the PES packet.

When using the DTS of the PES packet as a CPB extraction time point (=DTS) of the decoding unit located first, the image decoding apparatus fails to ensure the compatibility with a receiver which does not support the per-decoding unit operation. Thus, the image decoding apparatus uses the DTS of the PES packet as a DTS of an access unit as it conventionally does. Furthermore, it may be that the image coding apparatus stores DTS information on the decoding unit into an extended region of the PES packet header and the image decoding apparatus uses the DTS information.

For example, in the extended region, the image coding apparatus may list, in decoding order, DTSs of the decoding units included in the access unit, or may store information indicating a difference between the DTS of each decoding unit and the DTS of the PES packet.

Furthermore, in the common-interval mode, the image coding apparatus may store, into the extended region, only information indicating the DTS of the decoding unit located first in the access unit.

Furthermore, using the DTS included in the PES packet as the DTS of the access unit, the image decoding apparatus may parse the coded stream and thereby obtain a DTS of the decoding unit.

Furthermore, when the extraction is performed per decoding unit, the image coding apparatus may assign a DTS to the PES packet per decoding unit. In this case, the decoding unit extraction time point determination unit 506 can determine a DTS of a decoding unit by referring to the DTS stored in the header of the PES packet.

The following describes an effect obtained when the extraction from the CPB is performed per decoding unit.

Figure 14A:
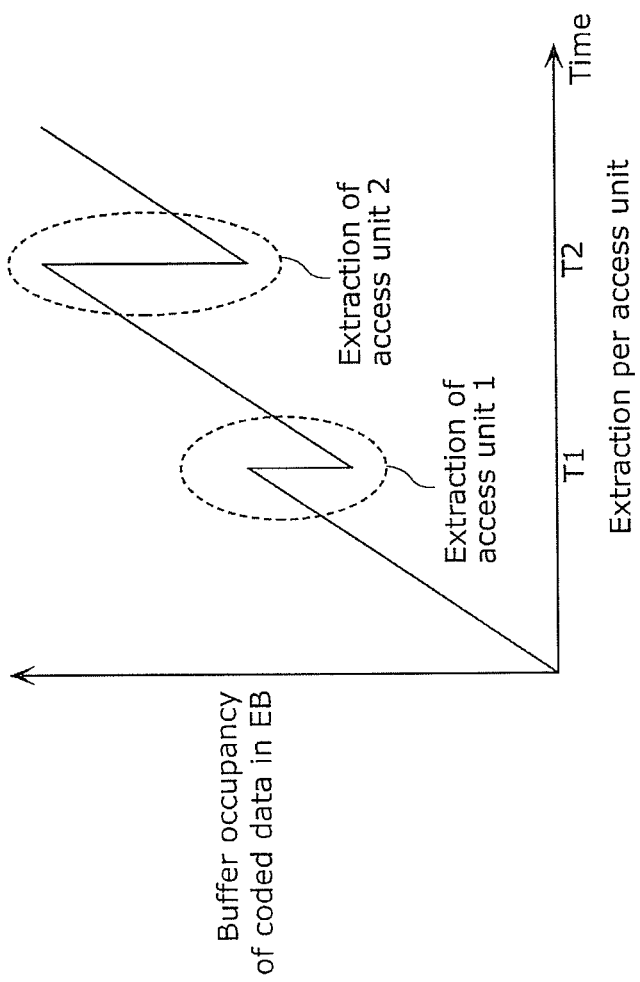
FIG. 14A shows an example of buffer occupancy according to Embodiment 1 in the case where extraction is performed per access unit.
Figure 14B:
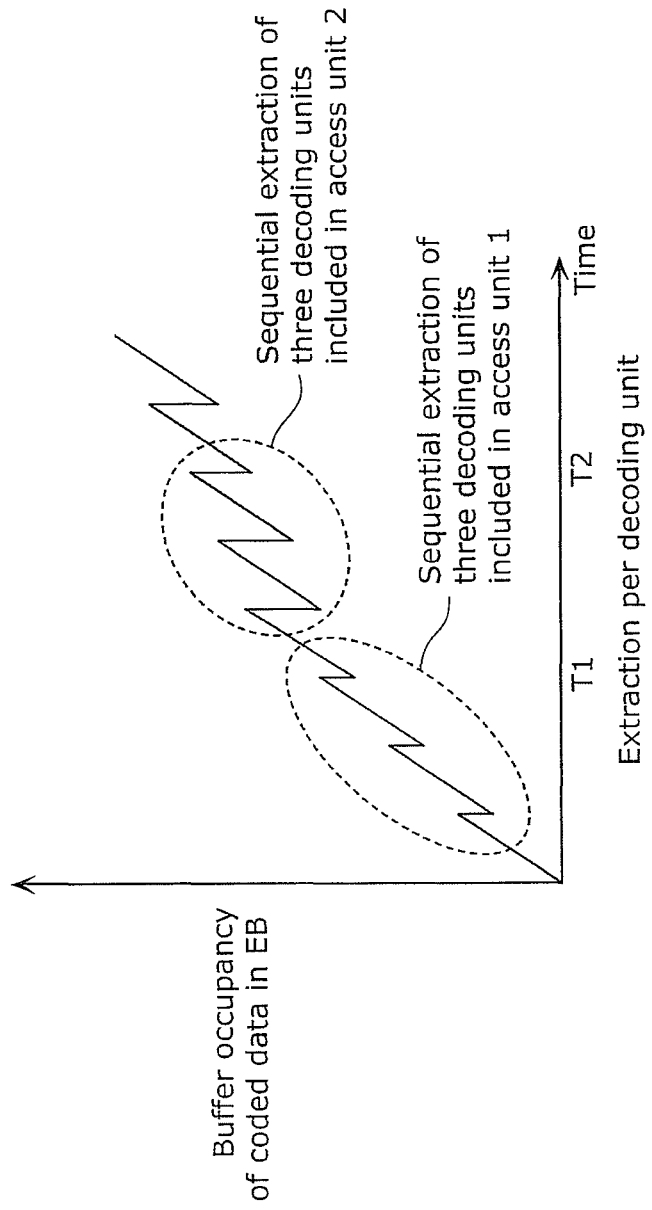
FIG. 14B shows an example of buffer occupancy according to Embodiment 1 in the case where extraction is performed per decoding unit.

FIG. 14A shows a transition of coded data in buffer occupancy of the EB 504 which is seen in the case where the extraction is performed per access unit. FIG. 14B shows a transition of coded data in buffer occupancy of the EB 504 which is seen in the case where the extraction is performed per decoding unit.

As shown in FIG. 14B, when the extraction is performed per decoding unit, the coed data of the decoding units is sequentially extracted, with the result that the buffer occupancy of the EB 504 is low as compared to the case shown in FIG. 14A where the extraction is performed per access unit. Thus, when the extraction from CPB is performed per decoding unit, the EB 504 can be reduced in size as compared to that in the case of per access unit.

It is to be noted that the image coding apparatus may include, into a descriptor or the like, information indicating the EB size necessary to perform the extraction per decoding unit, and transmit the information to the image decoding apparatus. With this, the image decoding apparatus can provide the EB 504 based on the EB size.

The following describes a method of calculating an interval between time points for extraction of the decoding units from the CPB in the image decoding apparatus.

The image decoding apparatus uses, as the interval between extraction time points in the common-interval mode, a value obtained by dividing the interval (picture_interval) between DTSs of two access units consecutive in decoding order by the number (num_ctbs_in_subpicture_minus1) of decoding units included in each access unit.

For example, when the interval between the DTSs of access units is 50 msec and each access unit includes five decoding units, the interval between extraction time points of decoding units is defined by 50/5=10 msec.

It is to be noted that, when the frame rate of the access units is fixed, the image decoding apparatus can determine an interval between extraction time points of decoding units based on the frame rate and the number of decoding units. Thus, in this case, it may be that the image coding apparatus skips transmitting the interval between extraction time points and the image decoding apparatus obtains the interval between extraction time points by calculation.

However, in the case where the frame rate is variable, the interval between extraction time points cannot be uniquely determined from the frame rate. Thus, the image coding apparatus includes, into the MPEG-2 TS or the coded stream, information indicating the interval between extraction time points and transmits it.

The following describes a case of applying this embodiment to multiplexing schemes other than the MPEG-2 TS.

The multiplexing schemes include, other than the MPEG-2 TS, the MP4 that is common for downloading and the real-time transport protocol (RTP) that is widely used for streaming, and the coded stream according to this embodiment is available in these multiplexing schemes.

First, the case of using the MP4 for the coded stream according to this embodiment is described.

The image coding apparatus stores the information described in the descriptor in the MPEG-2 TS into a box having a structure defined in the MP4. Specifically, the image coding apparatus stores the above information into, for example, a box which stores initialization information for use in decoding of coded data. Furthermore, when the extraction from the CPB is performed per decoding unit, the image coding apparatus may store information indicating the DTS of each decoding unit into the box.

Furthermore, in the MP4, a unit called sample which corresponds to the access unit is used. The image coding apparatus may store, in addition to address information of each sample, address information for accessing a decoding unit included in the sample.

Next, the case of using the RTP for the coded stream according to this embodiment is described.

By the image coding apparatus, the information described in the descriptor in the MPEG-2 TS is described in a payload header of an RTP packet or in a session description protocol (SDP), a session initial protocol (SIP), or the like which is used to exchange supplementary information on the RTP communication.

It is to be noted that the image coding apparatus may switch a unit of packetization according to whether the extraction from the CPB is performed per access unit or per decoding unit. For example, in the case where the extraction is performed per decoding unit, the image coding apparatus transmits one decoding unit as one RTP packet. Furthermore, the image coding apparatus transmits, to the image decoding apparatus, information indicating the unit of packetization using the supplementary information such as the SDP.

Furthermore, according to a unit of extraction from the CPB, the image coding apparatus may switch a method of storing the DTS which is to be described in the payload header of the RTP packet. For example, the image coding apparatus assigns a DTS per access unit in the case where the extraction is performed per access unit, and assigns a DTS per decoding unit in the case where the extraction is performed per decoding unit.

Furthermore, when the extraction is performed per decoding unit and the current mode is the common-interval mode, the image coding apparatus may indicate a DTS only for the decoding unit located first in the access unit. In this case, the image decoding apparatus uses a default interval for the subsequent decoding units, for example. This allows a reduction in the code amount necessary to transmit the DTSs.

Figure 15:
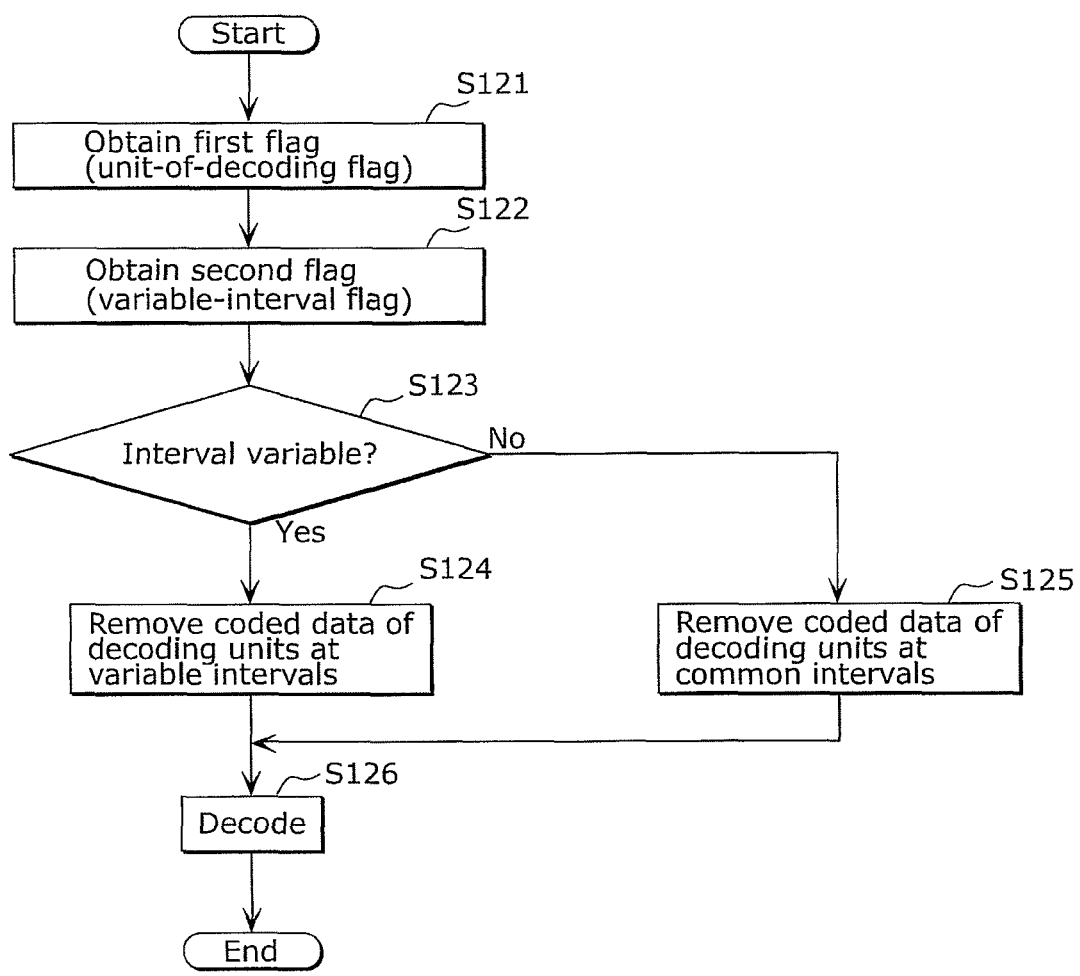
FIG. 15 is a flowchart of the image decoding method according to Embodiment 1.

As above, in the image decoding method according to this embodiment, the coded data is decoded for each of one or more units (per decoding unit) included in a picture (an access unit). As shown in FIG. 15, the image decoding apparatus obtains, from the coded stream including the coded data, a first flag (a unit-of-decoding flag) indicating whether a removal time of the coded data from the buffer (CPB) for storing the coded data is set per unit (S121).

Next, when the removal time of the coded data is set per unit, the image decoding apparatus obtains, from the coded bitstream, a second flag (a variable-interval flag) indicating whether an interval between the removal times of the units is constant or arbitrary (S122).

Next, the image decoding apparatus removes the coded data from the buffer per decoding unit and at a constant or arbitrary interval according to the second flag (S124 and S125). Specifically, when the second flag indicates that the interval is arbitrary (Yes in S123), the image decoding apparatus removes the coded data of the decoding units at variable intervals (S124). When the second flag indicates that the interval is constant (No in S123), the image decoding apparatus removes the coded data of the decoding units at common intervals (S125).

The image decoding apparatus then decodes the coded data of the decoding units removed in Step S124 or S125 (S126).

By doing so, when the time interval is constant, for example, the image decoding apparatus can determine time intervals of decoding units based on one common interval. This allows a reduction in the processing load of the image decoding apparatus.

Figure 16:
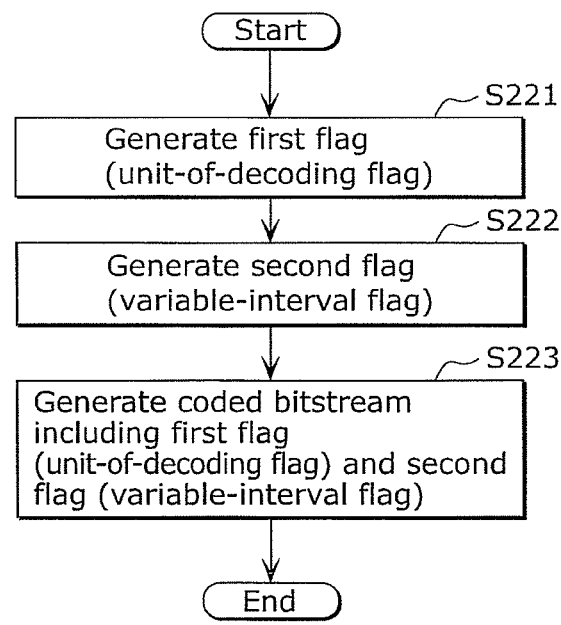
FIG. 16 is a flowchart of the image coding method according to Embodiment 1.

Furthermore, in the image coding method according to an exemplary embodiment disclosed herein, one or more units (decoding units) included in a picture (an access unit) is coded. As shown in FIG. 16, the image coding apparatus generates the first flag (the unit-of-decoding flag) indicating whether or not a removal time of the coded data by the hypothetical reference decoder from the buffer (CPB) for storing the coded data is set per unit (S221). Next, the image coding apparatus generates a second flag (a variable-interval flag) indicating whether the interval between the removal times of the coded data is constant or arbitrary (S222). Next, the image coding apparatus generates the coded bitstream including the coded data, the first flag, and the second flag (S223).

Furthermore, as described above, the image coding apparatus generates the second flag per picture group including one or more pictures. Moreover, the image coding apparatus includes the second flag into per-picture-group control information (a header) which is included in the coded bitstream and provided per picture group. This means that the image decoding apparatus obtains the second flag from the per-picture-group control information.

Here, the picture group is a unit of pictures (a sequence), for example. The per-picture-group control information is an SPS and more specifically is VUI included in the SPS. It is to be noted that the per-picture-group control information may be a descriptor in the MPEG-2 TS.

Furthermore, when the second flag indicates that the interval is constant (the common-interval mode), the image coding apparatus generates common-interval information indicating an interval which is common. Here, the common-interval information indicates, for example, the number (num_ctbs_in_subpicture_minus1) of decoding units included in one picture (an access unit), and the time interval between pictures (picture_interval). Using the number of decoding units and the time interval between pictures, the image decoding apparatus calculates an interval which is common, and removes the coded data from the buffer per decoding unit and at the calculated interval.

Furthermore, the image coding apparatus includes, just as the second flag, the common-interval information into the per-picture-group control information (e.g., the VUI). This means that, when the second flag indicates that the interval is constant (the common-interval mode), the image decoding apparatus obtains, from the per-picture-group control information, the common-interval information indicating the interval. Furthermore, when the second flag indicates that the interval is common (the common-interval mode), the image decoding apparatus removes the coded data from the buffer per decoding unit and at the common interval indicated in the common-interval information. It is to be noted that the image coding apparatus may include the common-interval information into per-picture control information (e.g., picture timing SEI) which is provided per picture. This means that, when the second flag indicates that the interval is constant (the common-interval mode), the image decoding apparatus obtains the common-interval information indicating the interval from the per-picture control information.

When the second flag indicates that the time interval is arbitrary (the variable-interval mode), the image coding apparatus generates variable-interval information (cpb_removal_delay) indicating intervals between the removal times of the decoding units. Furthermore, the image coding apparatus includes this variable-interval information into per-picture control information (e.g., picture timing SEI) which is included in the coded bitstream and provided per picture. This means that, when the second flag indicates that the interval is arbitrary (the variable-interval mode), the image decoding apparatus obtains the variable-interval information from the per-picture control information. The image decoding apparatus then removes the coded data from the buffer per decoding unit and at the intervals indicated in the variable-interval information.

It is to be noted that the image coding apparatus may include this variable-interval information into the per-unit control information (e.g., decoding unit CPB delay SEI) which is included in the coded stream and provided per decoding unit. This means that the image decoding apparatus may obtain the variable-interval information from the per-decoding-unit control information.

The coded bitstream includes a transport stream (TS) and a descriptor, and the image coding apparatus may include the second flag into the descriptor. This means that the image decoding apparatus may obtain the second flag from the descriptor.

The following describes basic structures of the coder 403 included in the image coding apparatus and the decoder 303 or 505 included in the image decoding apparatus.

Figure 17:
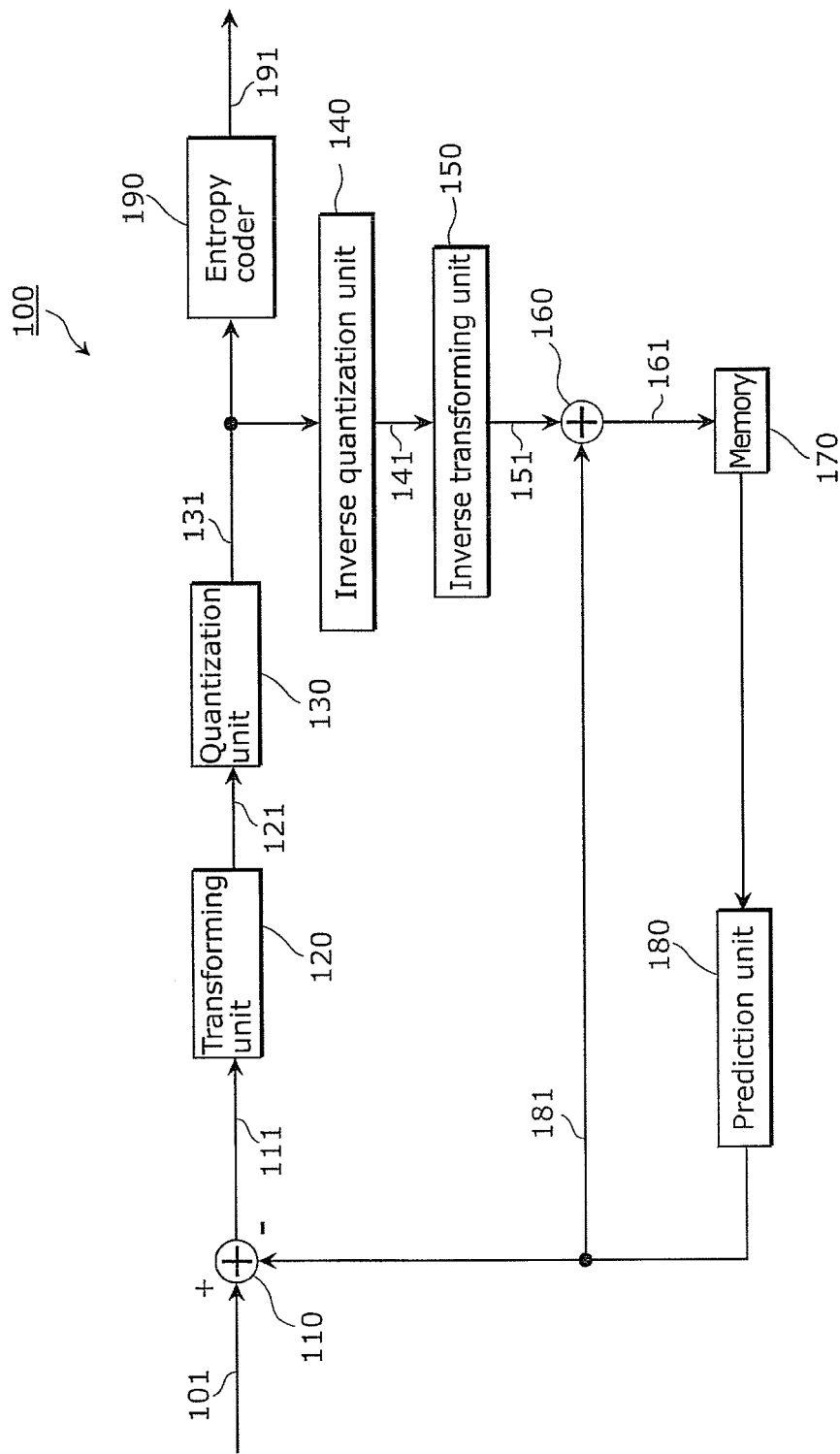
FIG. 17 is a block diagram of a coder according to Embodiment 1.

FIG. 17 is a block diagram of a coder 100 that is an example of the coder 403. This coder 100 codes, for example, audio data and video data at a low bit-rate.

The coder 100 shown in FIG. 17 codes an input image signal 101 to generate a coded signal 191. The coder 100 includes a subtractor 110, a transforming unit 120, a quantization unit 130, an inverse quantization unit 140, an inverse transforming unit 150, an adder 160, a memory 170, a prediction unit 180, and an entropy coder 190.

The subtractor 110 subtracts a prediction signal 181 from the input image signal 101 to generate a prediction error signal 111 (transform input signal), and provides the generated prediction error signal 111 to the transforming unit 120.

The transforming unit 120 performs frequency transform on the prediction error signal 111 to generate a transform output signal 121. More specifically, the transforming unit 120 transforms, from a temporal-spatial domain to a frequency domain, the prediction error signal 111 or the transform input signal generated by performing certain processing on the prediction error signal 111. As a result, the transforming unit 120 generates the transform output signal 121 having decreased correlation.

The quantization unit 130 quantizes the transform output signal 121, thereby generating a quantization coefficient 131 having a small total amount of data.

The entropy coder 190 codes the quantization coefficient 131 by using an entropy coding algorithm, thereby generating a coded signal 191 having further compressed redundancy.

The inverse quantization unit 140 inversely quantizes the quantization coefficient 131 to generate a decoded transform output signal 141. The inverse transforming unit 150 inversely transforms the decoded transform output signal 141 to generate a decoded transform input signal 151.

The adder 160 adds up the decoded transform input signal 151 and a prediction signal 181 to generate a decoded signal 161. The memory 170 stores the decoded signal 161.

The prediction unit 180 obtains a predetermined signal from the memory 170 according to a prediction method such as intra prediction or inter prediction, and generates a prediction signal 181 according to a predetermined method based on the prediction method. More specifically, the prediction unit 180 determines the prediction method to achieve a maximum coding efficiency, and generates the prediction signal 181 according to the determined prediction method. Furthermore, the entropy coder 190 performs entropy coding on the information indicating the prediction method, as needed.

Here, the inverse quantization unit 140, the inverse transforming unit 150, the adder 160, the memory 170, and the prediction unit 180 are included also in the image decoding apparatus. The decoded signal 161 corresponds to a reproduced image signal (decoded signal 261) generated by the image decoding apparatus.

Figure 18:
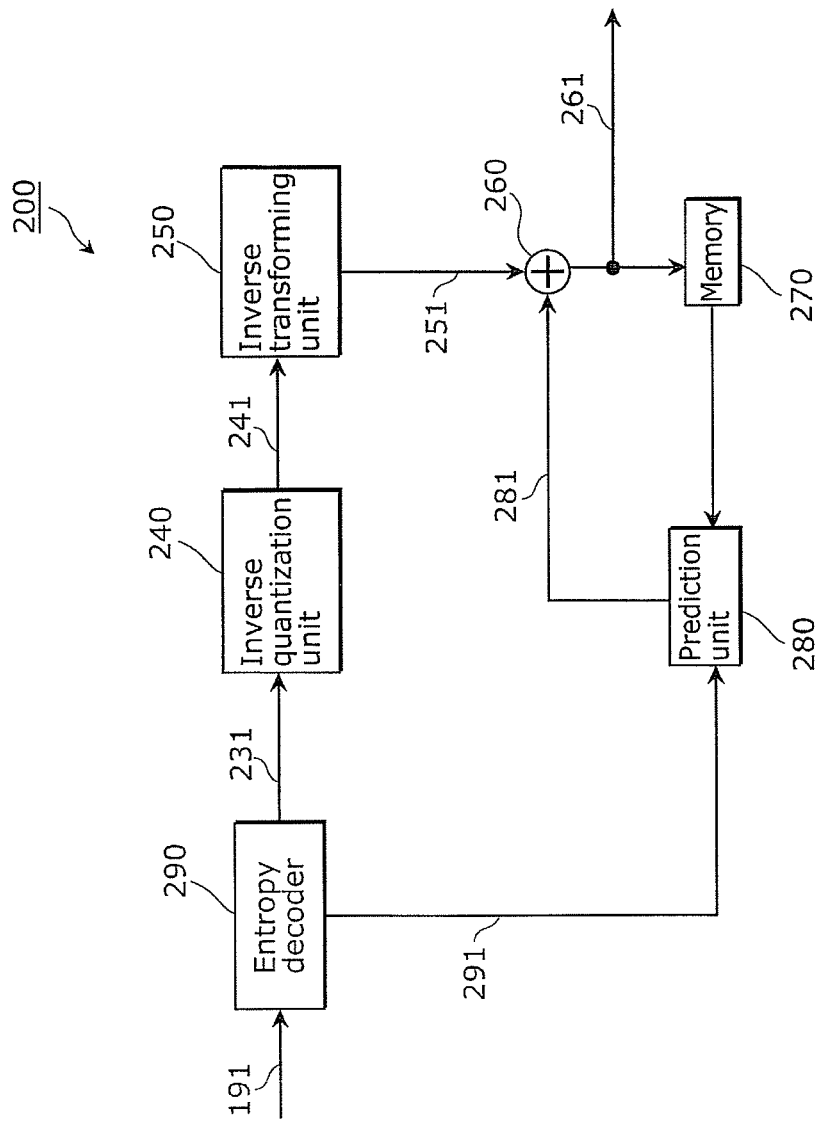
FIG. 18 is a block diagram of a decoder according to Embodiment 1.

FIG. 18 is a block diagram of a decoder 200 that is an example of the decoders 303 and 505. The decoder 200 shown in FIG. 18 decodes a coded signal 191 to generate a decoded signal 261. The decoder 200 includes an inverse quantization unit 240, an inverse transforming unit 250, an adder 260, a memory 270, a prediction unit 280, and an entropy decoder 290.

The entropy decoder 290 performs entropy decoding on the coded signal 191 to generate a quantization coefficient 231 and a prediction method 291.

The inverse quantization unit 240 inversely quantizes the quantization coefficient 231 to generate a decoded transform output signal 241. The inverse transforming unit 250 inversely transforms the decoded transform output signal 241 to generate a decoded transform input signal 251.

The adder 260 adds up the decoded transform input signal 251 and a prediction signal 281 to generate a decoded signal 261. The decoded signal 261 is a reproduced image generated by the decoder 200. The decoded signal 261 is outputted as an output signal of the image decoder 200, and also stored into the memory 270.

The prediction unit 280 obtains a predetermined signal from the memory 270 according to the prediction method 291, and generates a prediction signal 281 according to a predetermined method based on the prediction method 291.

Although the above describes the image coding apparatus and the image decoding apparatus according to the embodiment, this embodiment is descriptive and illustrative only, and the appended Claims are of a scope intended to cover and encompass not only the particular embodiment disclosed, but also equivalent structures, methods, and/or uses.

Furthermore, each of the processing units included in the image coding apparatus and the image decoding apparatus according to the above embodiment is typically implemented as a large-scale integration (LSI) that is an integrated circuit. Components may be each formed into a single chip, and it is also possible to integrate part or all of the components in a single chip.

This circuit integration is not limited to the LSI and may be achieved by providing a dedicated circuit or using a general-purpose processor. It is also possible to utilize a field programmable gate array (FPGA), with which the LSI is programmable after manufacture, or a reconfigurable processor, with which connections, settings, etc., of circuit cells in the LSI are reconfigurable.

Each of the structural elements in the above embodiment may be configured in the form of dedicated hardware, or may be realized by executing a software program suitable for the structural element. Each of the structural elements may be realized by means of a program executing unit, such as a CPU and a processor, reading and executing the software program recorded on a recording medium such as a hard disk or a semiconductor memory.

In other words, the image coding apparatus or the image decoding apparatus includes control circuitry and storage accessible from the control circuitry (i.e., accessible by the control circuitry). The control circuitry includes at least one of dedicated hardware and a program executing unit. In the case where the control circuitry includes the program executing unit, the storage stores a software program which is executed by the program executing unit.

Furthermore, these general and specific aspects may be implemented using the above software program or a computer-readable non-transitory recording medium on which the above program has been recorded. It goes without saying that the above program may be distributed via a communication network such as the Internet.

The numerals herein are all given to specifically illustrate the scope of the appended Claims and therefore do not limit it.

The segmentation of the functional blocks in each block diagram is an example, and some of the functional blocks may be implemented as one functional block while one functional block may be divided into plural parts, or part of the function of one functional block may be shifted to another functional block. Furthermore, the functions of a plurality of functional blocks which have similar functions may be processed in parallel or in time-sliced fashion by single hardware or software.

The processing order of the steps included in the above image coding or decoding method is given to specifically illustrate the scope of the appended Claims and therefore may be any other order. Part of the above steps may be performed at the same time as (in parallel with) another step.

The herein disclosed subject matter is to be considered descriptive and illustrative only, the appended Claims are of a scope intended to cover and encompass not only the particular embodiment disclosed, but also equivalent structures, methods, and/or uses.

(Embodiment 2)

The processing described in the above embodiment can be simply implemented in an independent computer system, by recording, in a recording medium, a program for implementing the configurations of the moving picture coding method (image coding method) or the moving picture decoding method (image decoding method) described in the above embodiment. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in the above embodiment and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 19:
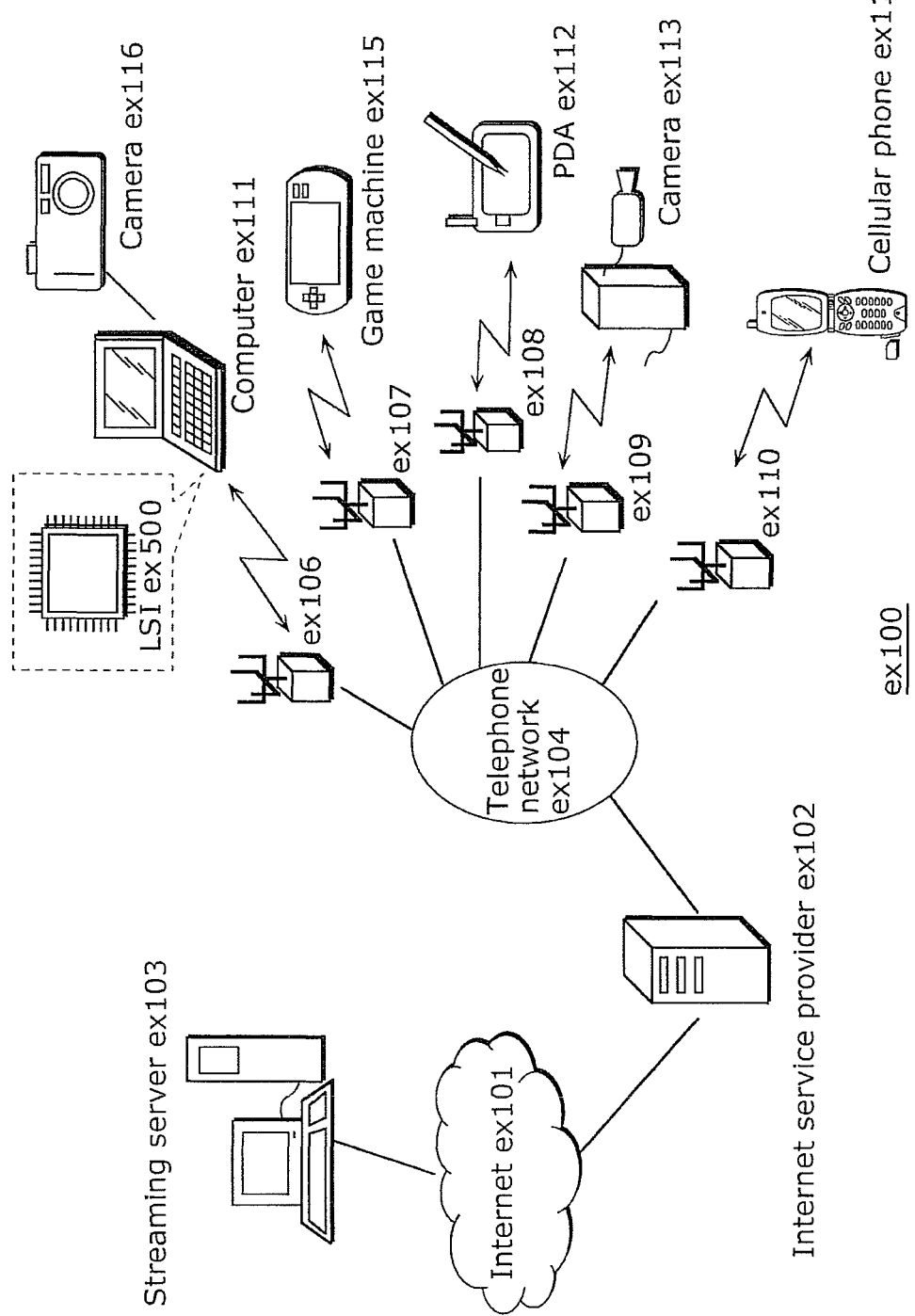
FIG. 19 illustrates an overall configuration of a content providing system ex190 for implementing content distribution services.

FIG. 19 illustrates an overall configuration of a content providing system ex100 for implementing content distribution services. The area for providing communication services is divided into cells of desired size, and base stations ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 19, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in the above embodiment (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be synthesized into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 20:
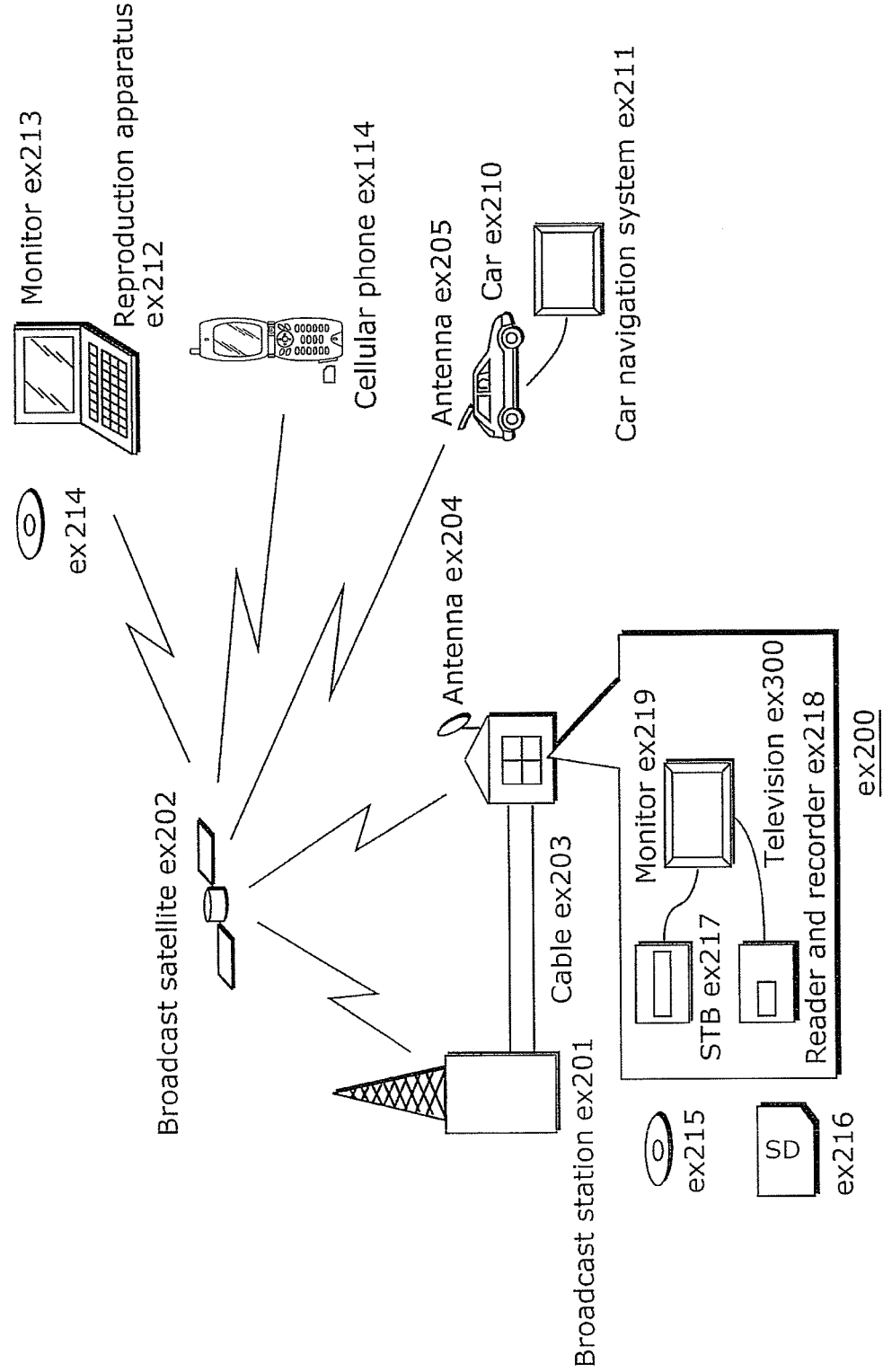
FIG. 20 illustrates an overall configuration of a digital broadcasting system.

Aside from the example of the content providing system ex100, at least one of the moving picture coding apparatus (image coding apparatus) and the moving picture decoding apparatus (image decoding apparatus) described in the above embodiment may be implemented in a digital broadcasting system ex200 illustrated in FIG. 20. More specifically, a broadcast station ex201 communicates or transmits, via radio waves to a broadcast satellite ex202, multiplexed data obtained by multiplexing audio data and others onto video data. The video data is data coded by the moving picture coding method described in the above embodiment (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in the above embodiment. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 21:
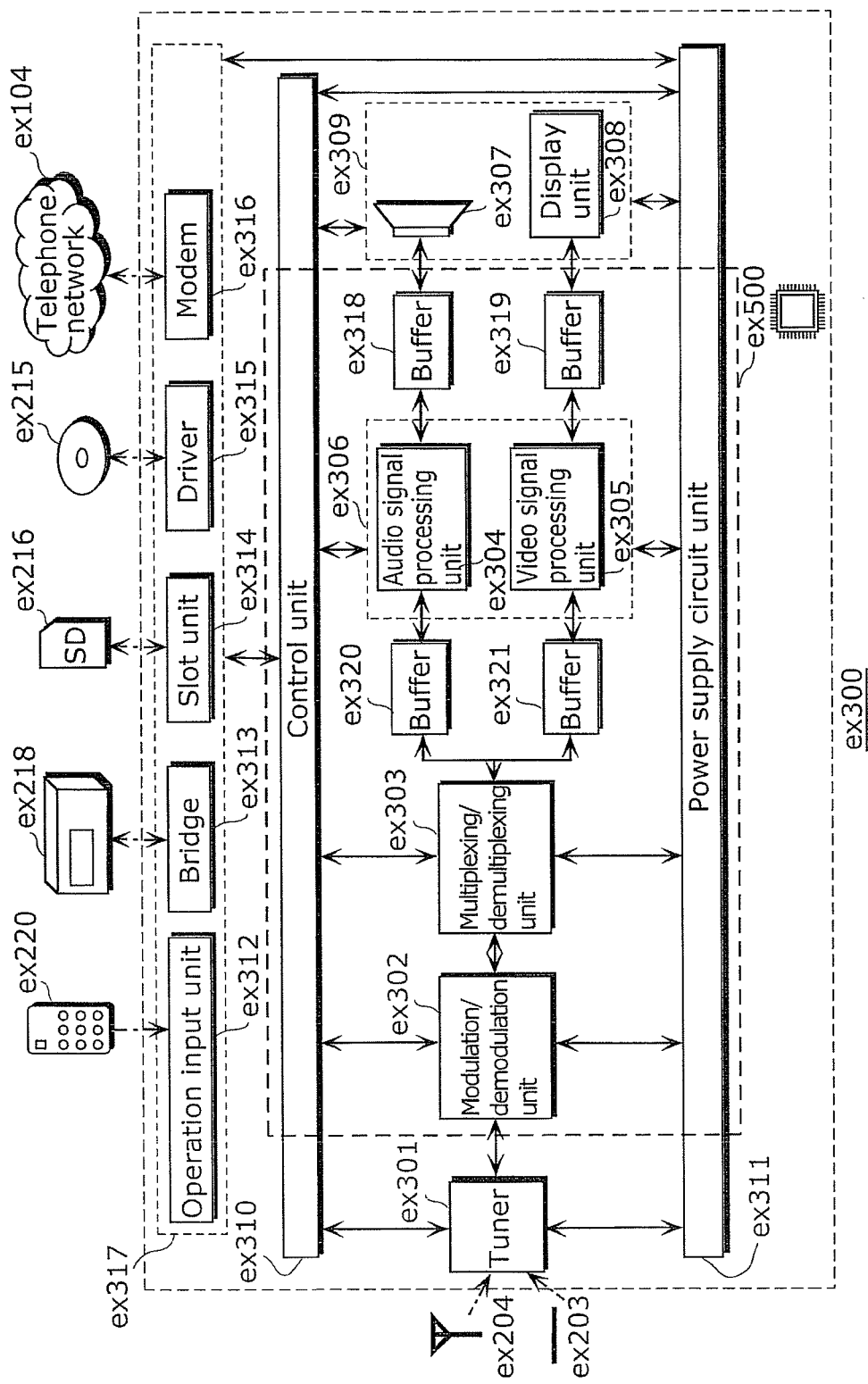
FIG. 21 illustrates a block diagram illustrating an example of a configuration of a television.

FIG. 21 illustrates the television (receiver) ex300 that uses the moving picture coding method and the moving picture decoding method described in the above embodiment. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in the above embodiment, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in the above embodiment. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrated, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 22:
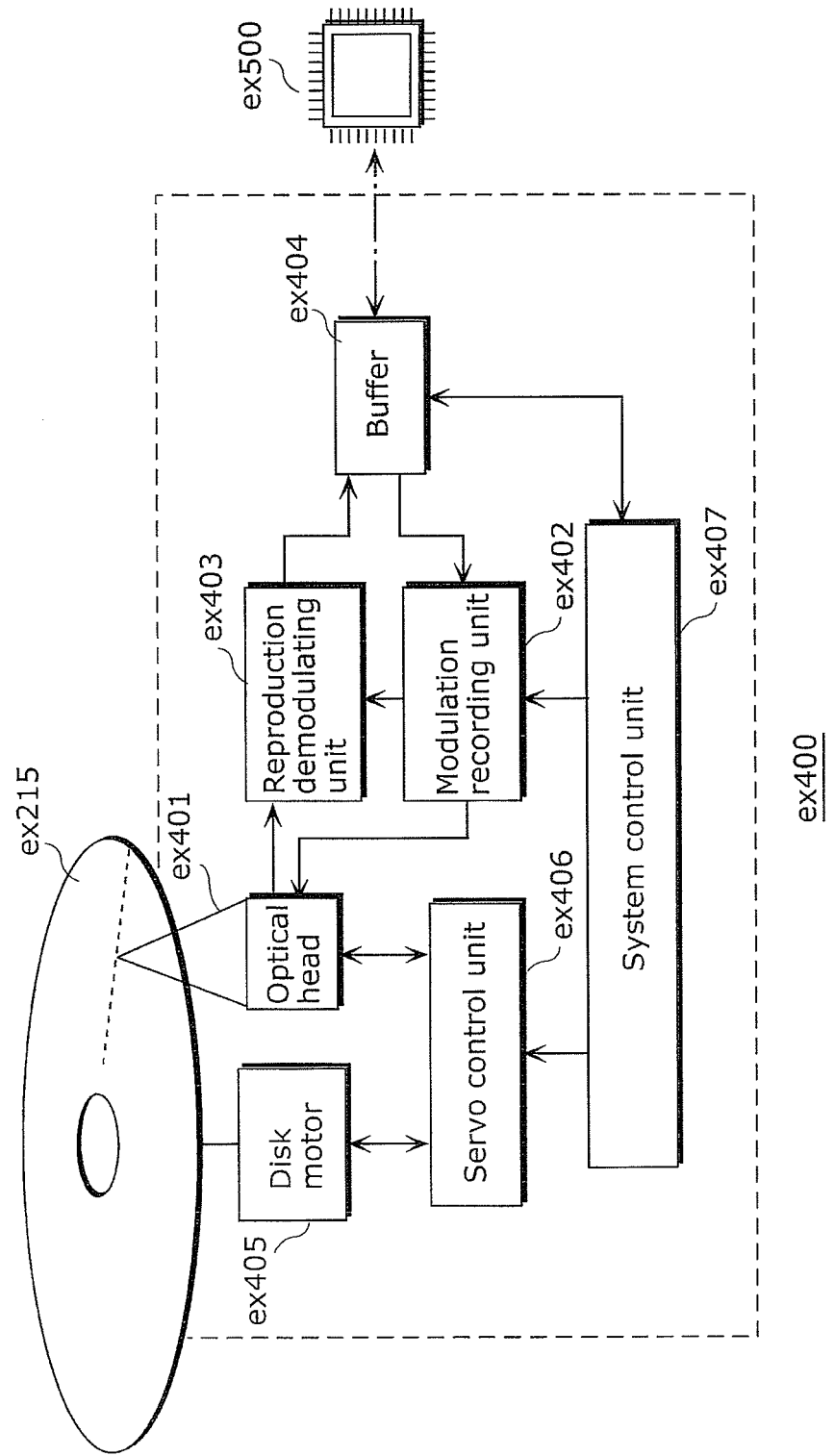
FIG. 22 illustrates a block diagram illustrating an example of a configuration of an information reproducing/recording unit that reads and writes information from and on a recording medium that is an optical disk.

As an example, FIG. 22 illustrates a configuration of an information reproducing/recording unit ex4000 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 23:
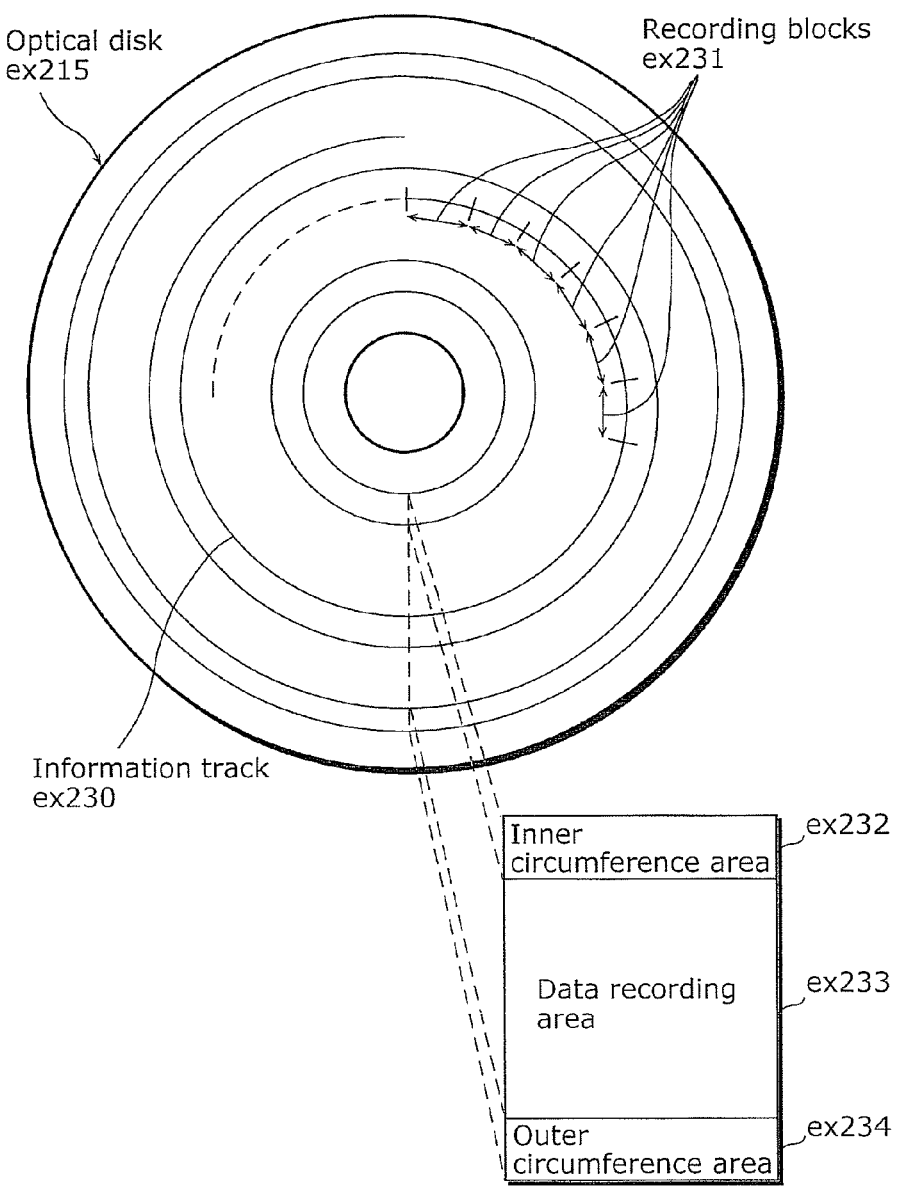
FIG. 23 illustrates an example of a configuration of a recording medium that is an optical disk.

FIG. 23 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others.

Figure 24A:
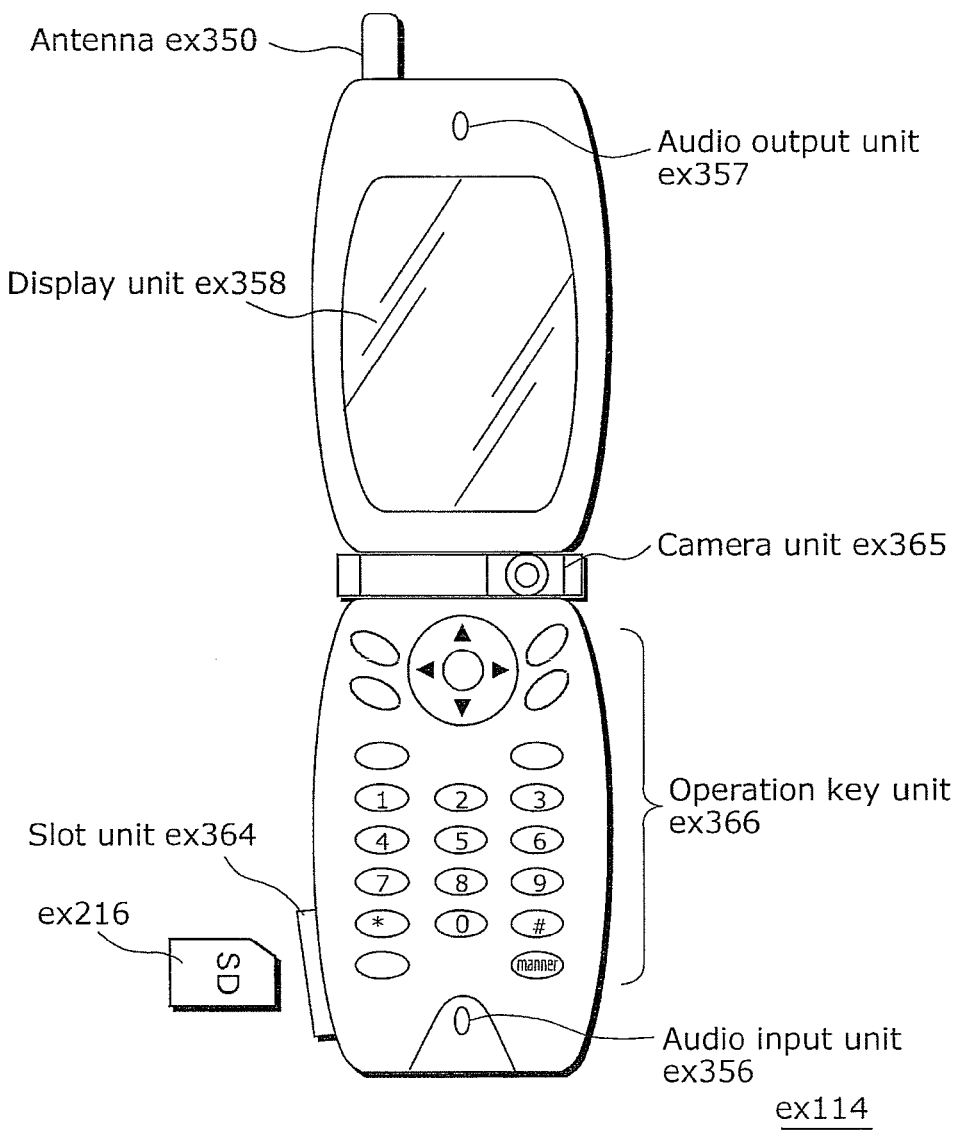
FIG. 24A illustrates an example of a cellular phone.

FIG. 24A illustrates the cellular phone ex114 that uses the moving picture coding method and the moving picture decoding method described in the above embodiment. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Figure 24B:
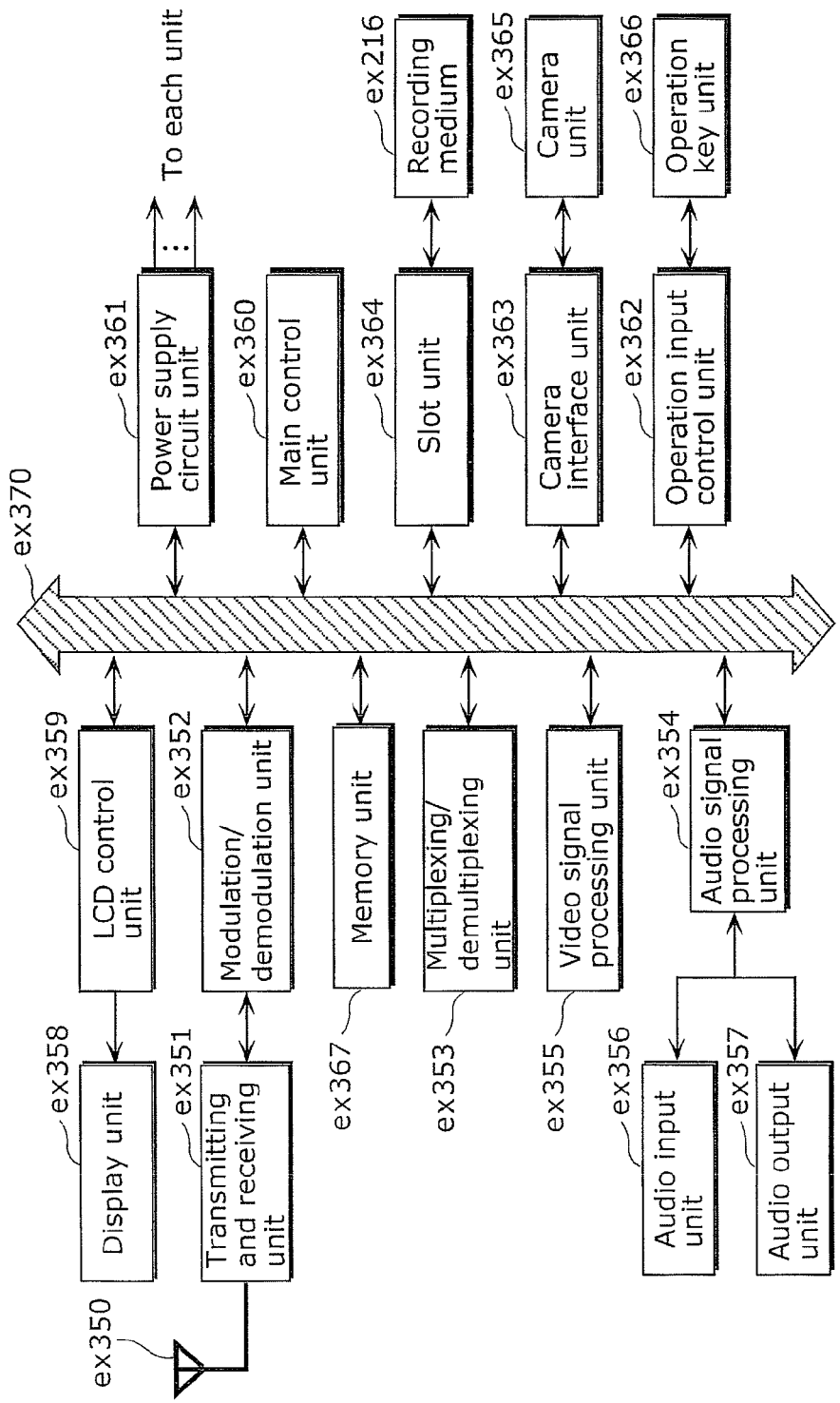
FIG. 24B is a block diagram showing an example of a configuration of a cellular phone.

Next, an example of a configuration of the cellular phone ex114 will be described with reference to FIG. 24B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in the above embodiment (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in the above embodiment (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in the above embodiment can be used in any of the devices and systems described. Thus, the advantages described in the above embodiment can be obtained.

Furthermore, various modifications and revisions can be made in any of the embodiments in the present disclosure.

(Embodiment 3)

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 25 illustrates a structure of the multiplexed data. As illustrated in FIG. 25, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 26:
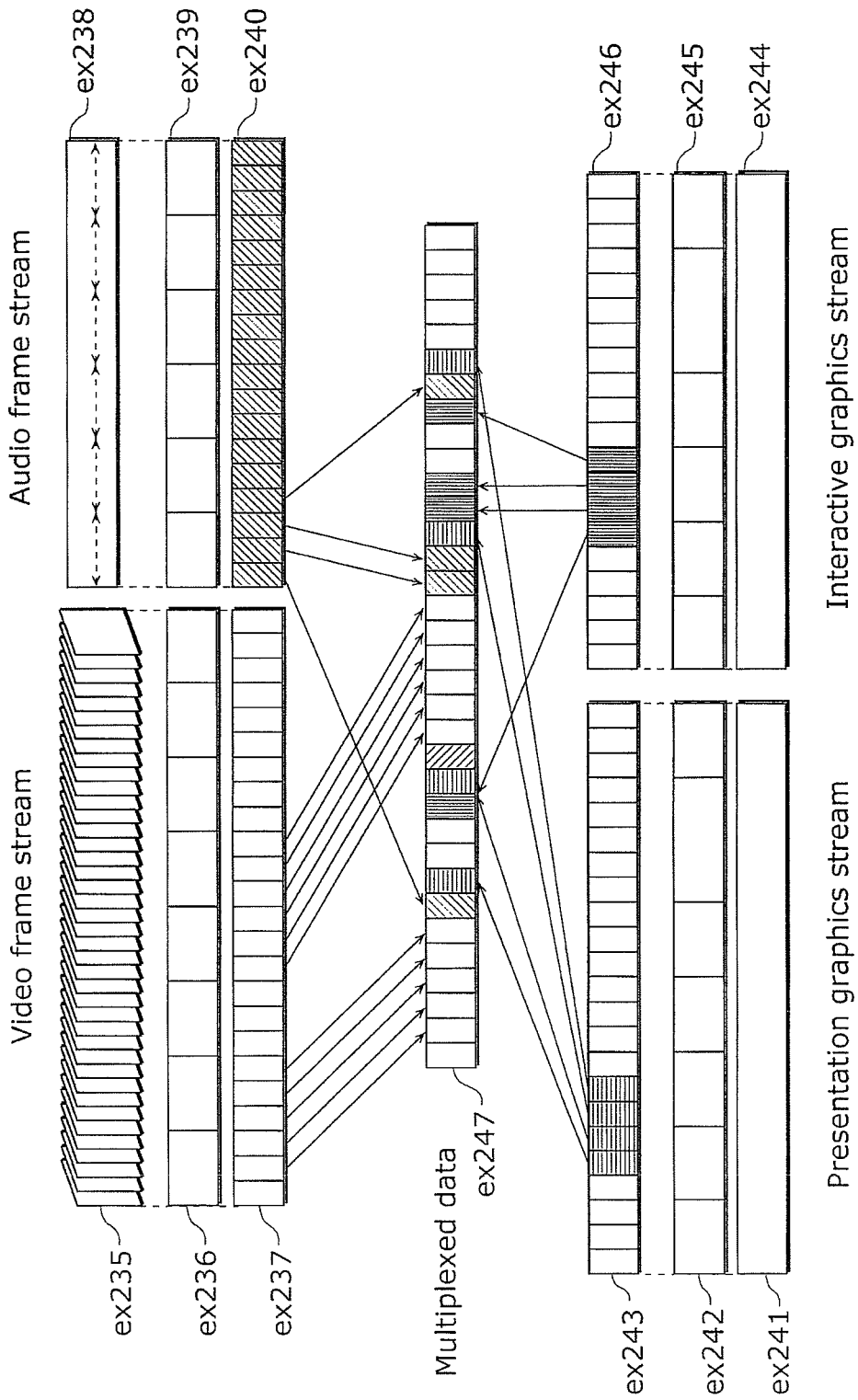
FIG. 26 schematically illustrates how each stream is multiplexed in multiplexed data.

FIG. 26 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 27:
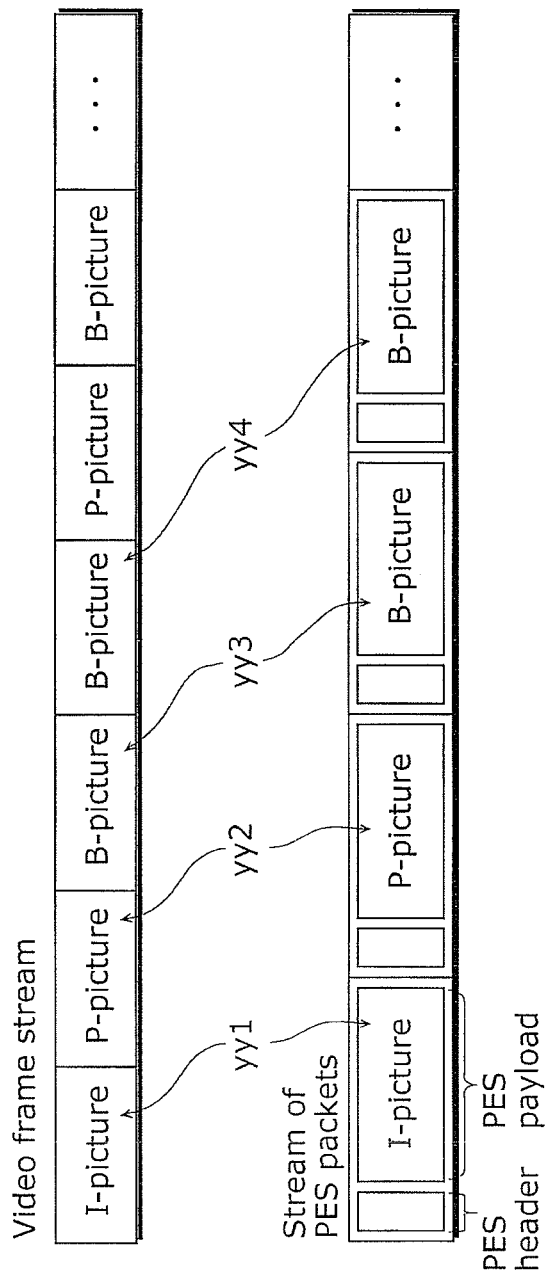
FIG. 27 illustrates how a video stream is stored in a stream of PES packets in more detail.

FIG. 27 illustrates how a video stream is stored in a stream of PES packets in more detail. The first bar in FIG. 27 shows a video frame stream in a video stream. The second bar shows the stream of PES packets. As indicated by arrows denoted as yy1, yy2, yy3, and yy4 in FIG. 27, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 28:
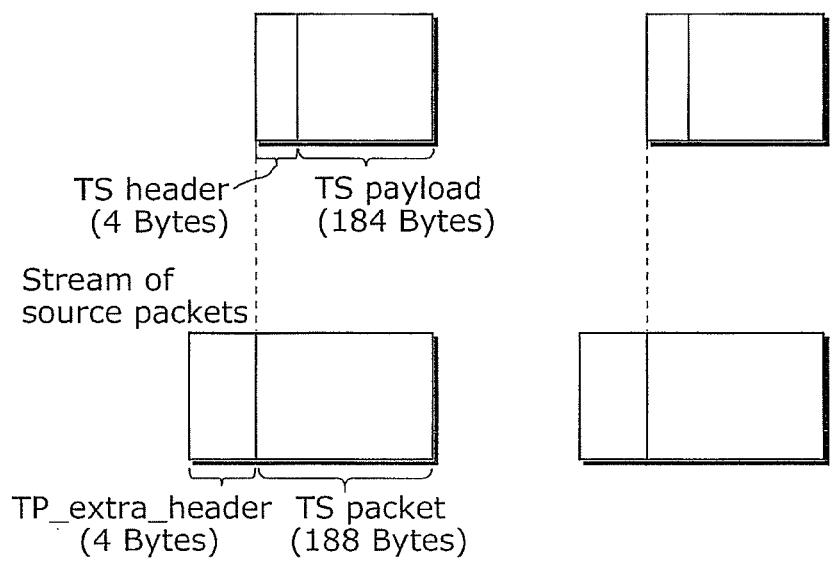
FIG. 28 illustrates a structure of TS packets and source packets in the multiplexed data.

FIG. 28 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 28. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information on the streams corresponding to the PIDs. The PMT also has various descriptors relating to the multiplexed data.

The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 29:
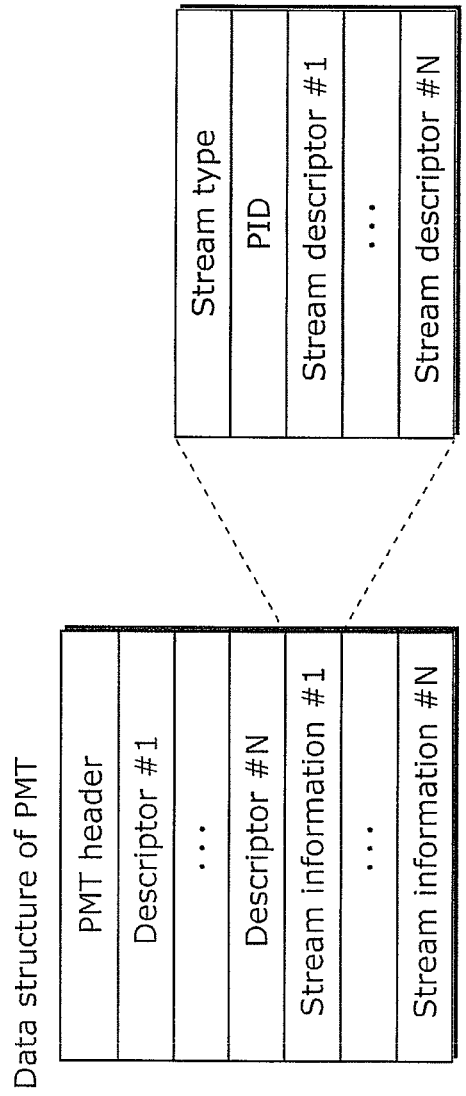
FIG. 29 illustrates a data structure of a PMT.

FIG. 29 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 30:
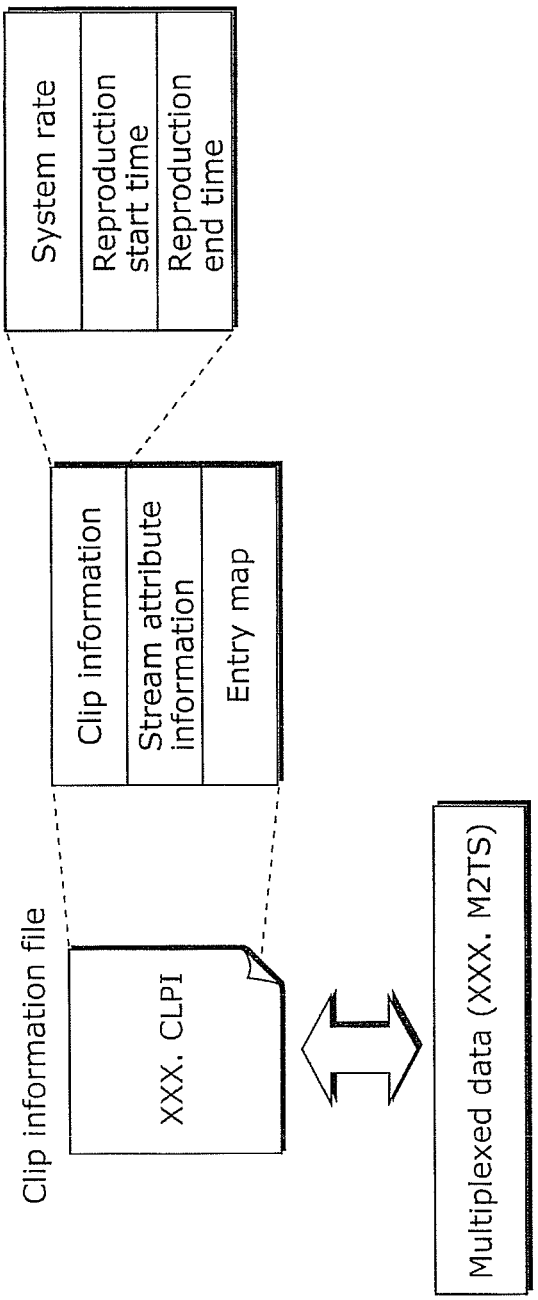
FIG. 30 illustrates an internal structure of multiplexed data information.

Each of the multiplexed data information files is management information of the multiplexed data as shown in FIG. 30. The multiplexed data information files are in one to one correspondence with the multiplexed data, and each of the files includes multiplexed data information, stream attribute information, and an entry map.

As illustrated in FIG. 30, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 31:
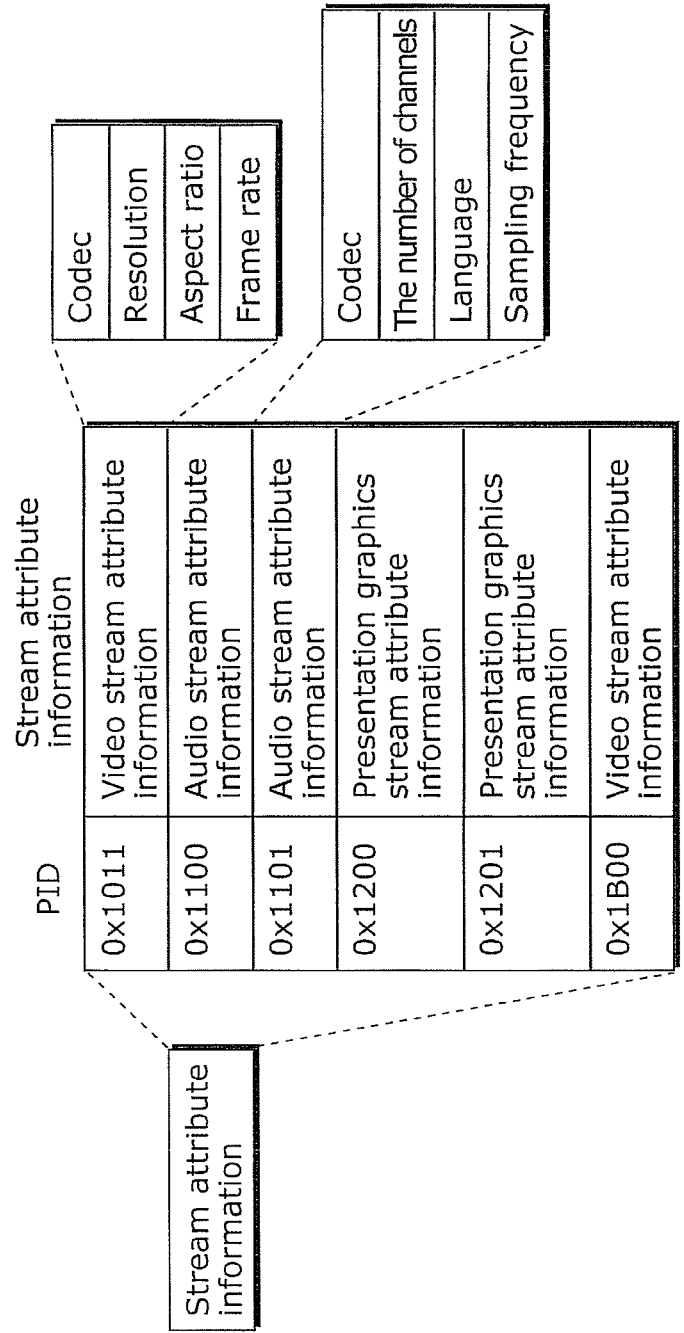
FIG. 31 illustrates an internal structure of stream attribute information.

As shown in FIG. 31, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In this embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 32:
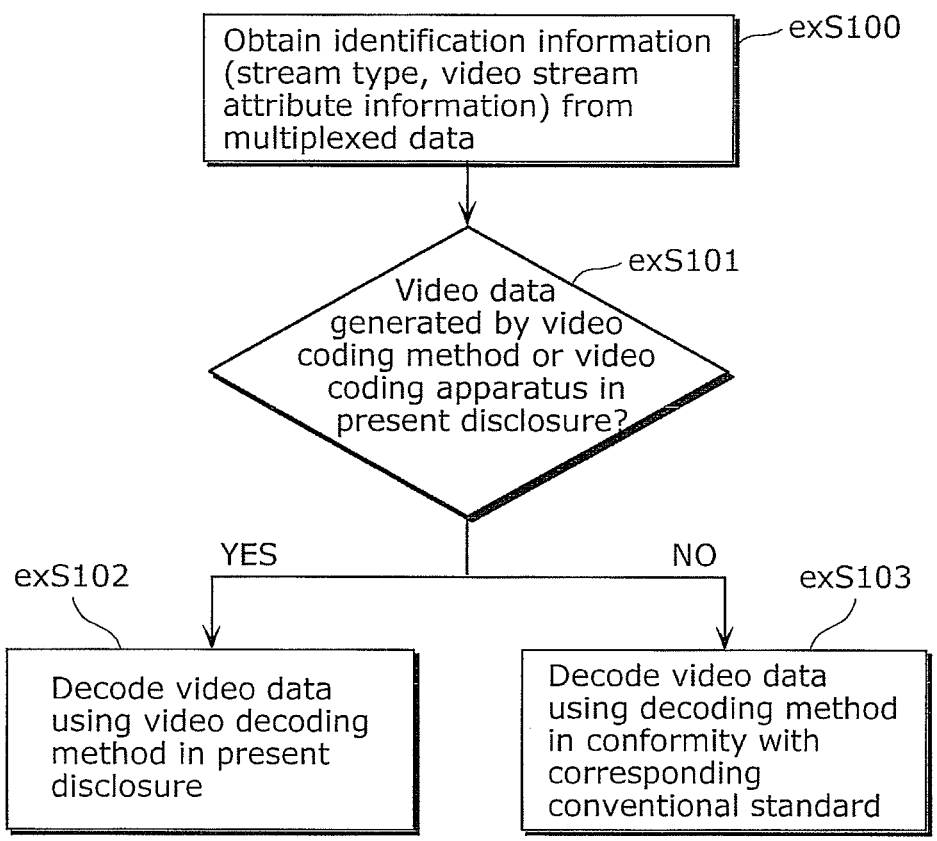
FIG. 32 illustrates steps for identifying video data.

Furthermore, FIG. 32 illustrates steps of the moving picture decoding method according to this embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in this embodiment can be used in the devices and systems described above.

(Embodiment 4)

Figure 33:
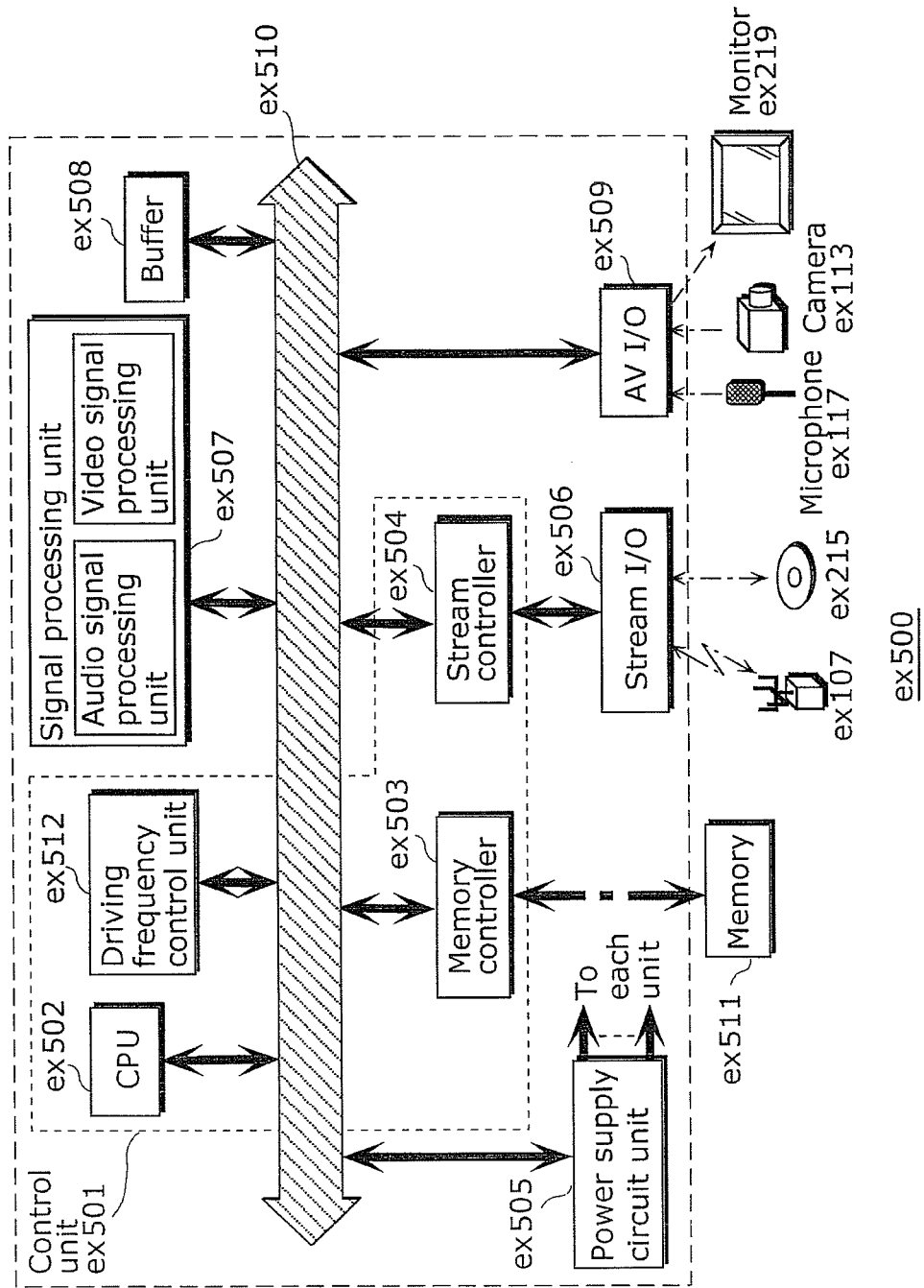
FIG. 33 illustrates an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example, FIG. 33 illustrates a configuration of an LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware In the future, with advancement in semiconductor technology, a brand-new technology may replace LSI. The functional blocks can be integrated using such a technology. The possibility is that the present disclosure is applied to biotechnology.

(Embodiment 5)

When video data generated in the moving picture coding method or by the moving picture coding apparatus described in each of Embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 34:
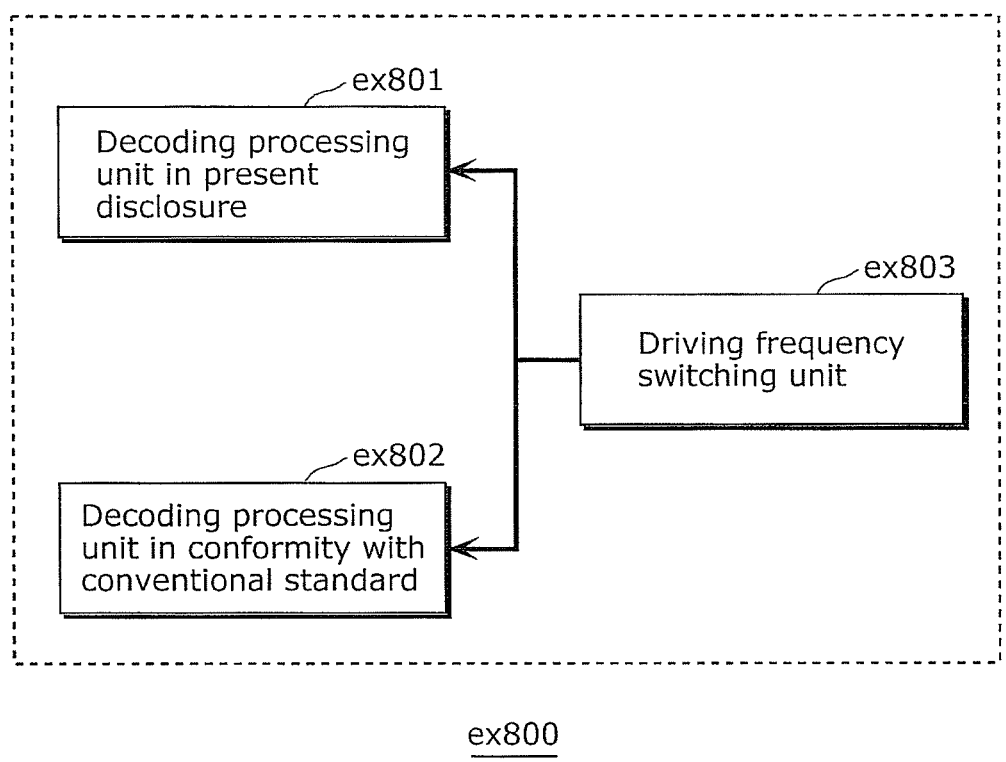
FIG. 34 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 34 illustrates a configuration ex800 in the present embodiment. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 33. Here, each of the decoding processing unit ex801 that executes the moving picture decoding method described in each of Embodiments and the decoding processing unit ex802 that conforms to the conventional standard corresponds to the signal processing unit ex507 in FIG. 33. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 36. The driving frequency can be selected by storing the look-up table in the buffer ex508 and in an internal memory of an LSI, and with reference to the look-up table by the CPU ex502.

Figure 35:
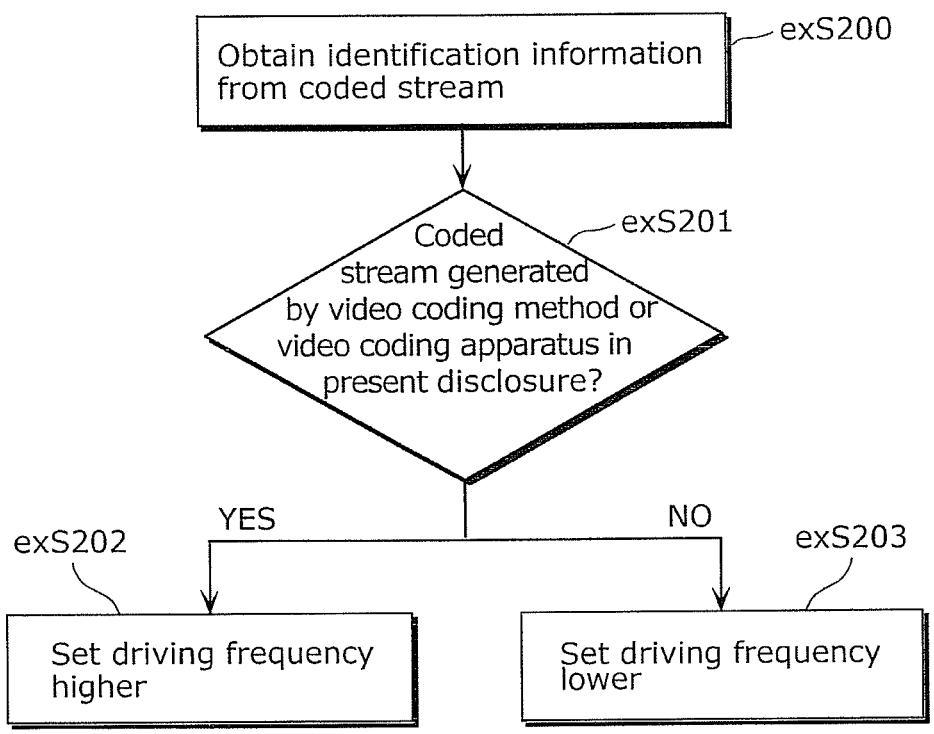
FIG. 35 illustrates steps for identifying video data and switching between driving frequencies.

FIG. 35 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the moving picture coding method and the moving picture coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 6)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 37A:
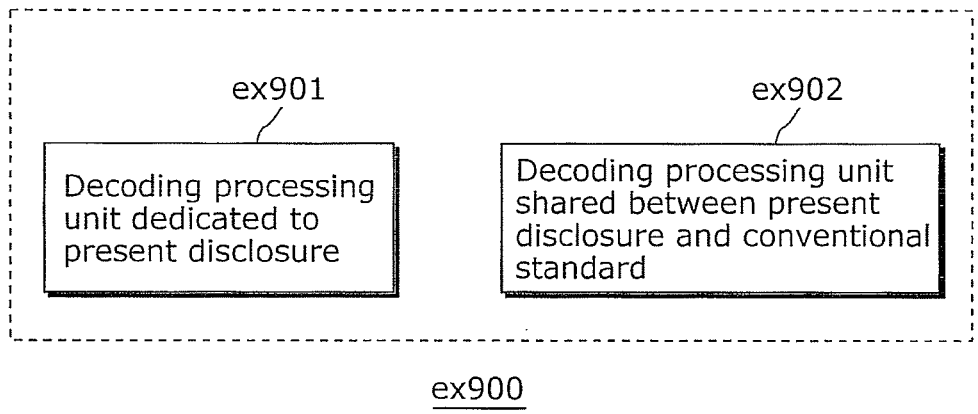
FIG. 37A is a diagram showing an example of a configuration for sharing a module of a signal processing unit.

In order to solve the problem, what is conceived is a configuration in which the decoding processing unit for implementing the moving picture decoding method described in each of Embodiments and the decoding processing unit that conforms to the conventional standard, such as MPEG-2, MPEG-4 AVC, and VC-1 are partly shared. Ex900 in FIG. 37A shows an example of the configuration. For example, the moving picture decoding method described in each of Embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by the extraction of coded data from a buffer in particular, for example, the dedicated decoding processing unit ex901 is used for this extraction of coded data. Otherwise, the decoding processing unit is probably shared for one of the entropy decoding, inverse quantization, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG-4 AVC.

Figure 37B:
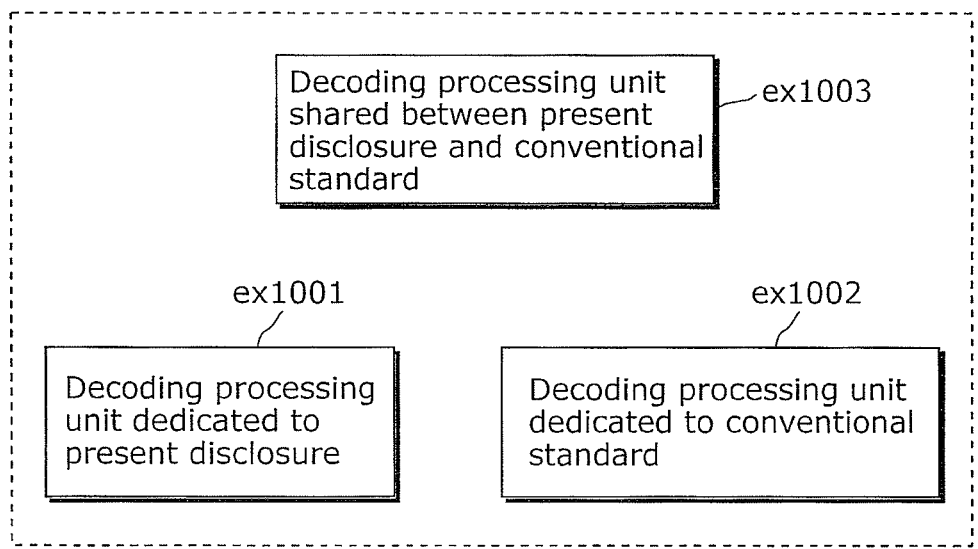
FIG. 37B is a diagram showing another example of a configuration for sharing a module of the signal processing unit.

Furthermore, ex1000 in FIG. 37B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiment(s) disclosed, but also equivalent structures, methods, and/or uses.

Industrial Applicability

One or more exemplary embodiments disclosed herein are applicable to image coding methods, image decoding methods, image coding apparatuses, and image decoding apparatuses. One or more exemplary embodiments disclosed herein can be used for information display devices and imaging devices with high resolution which include image coding apparatuses, such as televisions, digital video recorders, car navigation systems, cellular phones, digital cameras, and digital video cameras.

The invention claimed is:

1. An image decoding method of decoding encoded data per unit included in units that are included in a picture, the image decoding method comprising:
   obtaining, from an encoded bitstream including the encoded data, a first flag indicating whether or not a removal time of the encoded data from a buffer is set per unit, the buffer being for storing the encoded data;
   obtaining, from the encoded bitstream, a second flag indicating whether an interval between removal times of the units is constant or arbitrary when the removal times are set per unit;
   obtaining common-interval information from per-picture control information when the second flag indicates that the interval is constant, the common-interval information indicating the interval, and the per-picture control information being included in the encoded bitstream and provided per picture;
   removing the encoded data from the buffer per unit and at a constant or arbitrary interval according to the second flag; and
   decoding the removed encoded data,
   wherein, in the removing, when the second flag indicates that the interval is constant, the encoded data is removed from the buffer per unit and at the interval indicated in the common-interval information.

2. An image decoding apparatus for decoding encoded data per unit included in units that are included in a picture, the image decoding apparatus comprising:
   control circuitry; and
   a storage accessible from the control circuitry,
   wherein the control circuitry executes:
      obtaining, from an encoded bitstream including the encoded data, a first flag indicating whether or not a removal time of the encoded data from a buffer is set per unit, the buffer being for storing the encoded data;
      obtaining, from the encoded bitstream, a second flag indicating whether an interval between removal times of the units is constant or arbitrary when the removal times are set per unit;
      obtaining common-interval information from per-picture control information when the second flag indicates that the interval is constant, the common-interval information indicating the interval, and the per-picture control information being included in the encoded bitstream and provided per picture;
      removing the encoded data from the buffer per unit and at a constant or arbitrary interval according to the second flag; and
      decoding the removed encoded data, and
   wherein, in the removing, when the second flag indicates that the interval is constant, the encoded data is removed from the buffer per unit and at the interval indicated in the common-interval information.

* * * * *